(12) United States Patent
Kennard et al.

(10) Patent No.: US 10,166,561 B2
(45) Date of Patent: Jan. 1, 2019

(54) FLUID RESERVOIR AND DISPENSING DEVICE

(71) Applicant: THEODOSIER PTY LTD, Naremburn (AU)

(72) Inventors: Rory Campbell Kennard, Artarmon (AU); Michael Chen, Artarmon (AU); Thomas Barna, Artarmon (AU)

(73) Assignee: MAKINEX IP PTY LTD, Artarmon, New South Wales (AU)

( * ) Notice: Subject to any disclaimer, the term of this patent is extended or adjusted under 35 U.S.C. 154(b) by 0 days.

(21) Appl. No.: 15/580,759

(22) PCT Filed: Feb. 15, 2016

(86) PCT No.: PCT/AU2016/050098
§ 371 (c)(1),
(2) Date: Dec. 8, 2017

(87) PCT Pub. No.: WO2016/197185
PCT Pub. Date: Dec. 15, 2016

(65) Prior Publication Data
US 2018/0147587 A1    May 31, 2018

(30) Foreign Application Priority Data
Jun. 12, 2015   (AU) ................................ 2015902230

(51) Int. Cl.
*B05B 9/08* (2006.01)
*F16J 12/00* (2006.01)
(Continued)

(52) U.S. Cl.
CPC .............. *B05B 9/0833* (2013.01); *B05B 1/00* (2013.01); *B05B 9/08* (2013.01); *F16J 12/00* (2013.01);
(Continued)

(58) Field of Classification Search
CPC .. B05B 9/0833; B05B 1/00; B05B 9/08; F16J 12/00; F17C 13/06; F17C 2201/0109;
(Continued)

(56) References Cited

U.S. PATENT DOCUMENTS 3,404,813 A    10/1968  Waxman
3,883,046 A *   5/1975  Thompson ............. B65D 88/62
                                              220/723

(Continued)

FOREIGN PATENT DOCUMENTS

EP         0285761 A1    4/1987
WO      1994/025372 A1   11/1994

*Primary Examiner* — Benjamin R Shaw
(74) *Attorney, Agent, or Firm* — Whitham & Cook, P.C.

(57) ABSTRACT

The present invention also provides a liquid reservoir assembly 10 of the type that can store and release a fluid under pressure, the assembly 10 having an outer body formed of an open ended tube 20 which is closed by end formations 70, 80 which engage respective ends of the open ended tube 20 and are held stationary with respect to the open ended tube 20, the end formations 70,80 holding between them an elongated elastic inner tube 30 sealing secured to the end formations, the elastic inner tube 30 being axially pre-tensioned or stretched from its natural or rest state, and secured to the ends in the pre-tensioned or stretched condition.

20 Claims, 18 Drawing Sheets

(51) Int. Cl.
  *F17C 13/06* (2006.01)
  *B05B 1/00* (2006.01)
(52) U.S. Cl.
  CPC ...... *F17C 13/06* (2013.01); *F17C 2201/0109* (2013.01); *F17C 2205/0111* (2013.01); *F17C 2205/0138* (2013.01); *F17C 2205/0142* (2013.01)
(58) Field of Classification Search
  CPC ...... F17C 2205/0111; F17C 2205/0138; F17C 2205/0142
  USPC .......................................................... 222/105
  See application file for complete search history.

(56) References Cited

U.S. PATENT DOCUMENTS

| | | | |
|---|---|---|---|
| 4,013,195 A | 3/1977 | Ferris | |
| 4,085,865 A * | 4/1978 | Thompson | B67D 1/0462 220/720 |
| 4,386,929 A * | 6/1983 | Peery | A61M 5/152 222/211 |
| 5,080,652 A | 1/1992 | Sancoff et al. | |
| 5,135,497 A | 8/1992 | Hessel et al. | |
| 5,137,175 A * | 8/1992 | Kowalski | B65D 77/067 222/1 |
| 5,137,275 A | 8/1992 | Kowalski et al. | |
| 5,422,709 A | 7/1995 | Kriesel | |
| 7,140,406 B2 * | 11/2006 | Gustafsson | B67C 3/28 141/114 |
| 2003/0189053 A1 * | 10/2003 | Felbaum | F17C 1/02 220/582 |
| 2009/0208811 A1 * | 8/2009 | Nakamura | F17C 13/04 429/404 |
| 2011/0210127 A1 * | 9/2011 | Strack | F16J 12/00 220/586 |
| 2017/0292651 A1 * | 10/2017 | Newhouse | B22F 3/11 |
| 2017/0343158 A1 * | 11/2017 | Kato | F16J 12/00 |
| 2018/0163926 A1 * | 6/2018 | Fujiki | B29C 53/58 |
| 2018/0163927 A1 * | 6/2018 | Kanezaki | F16J 12/00 |
| 2018/0200968 A1 * | 7/2018 | Ueda | B29C 70/545 |

* cited by examiner

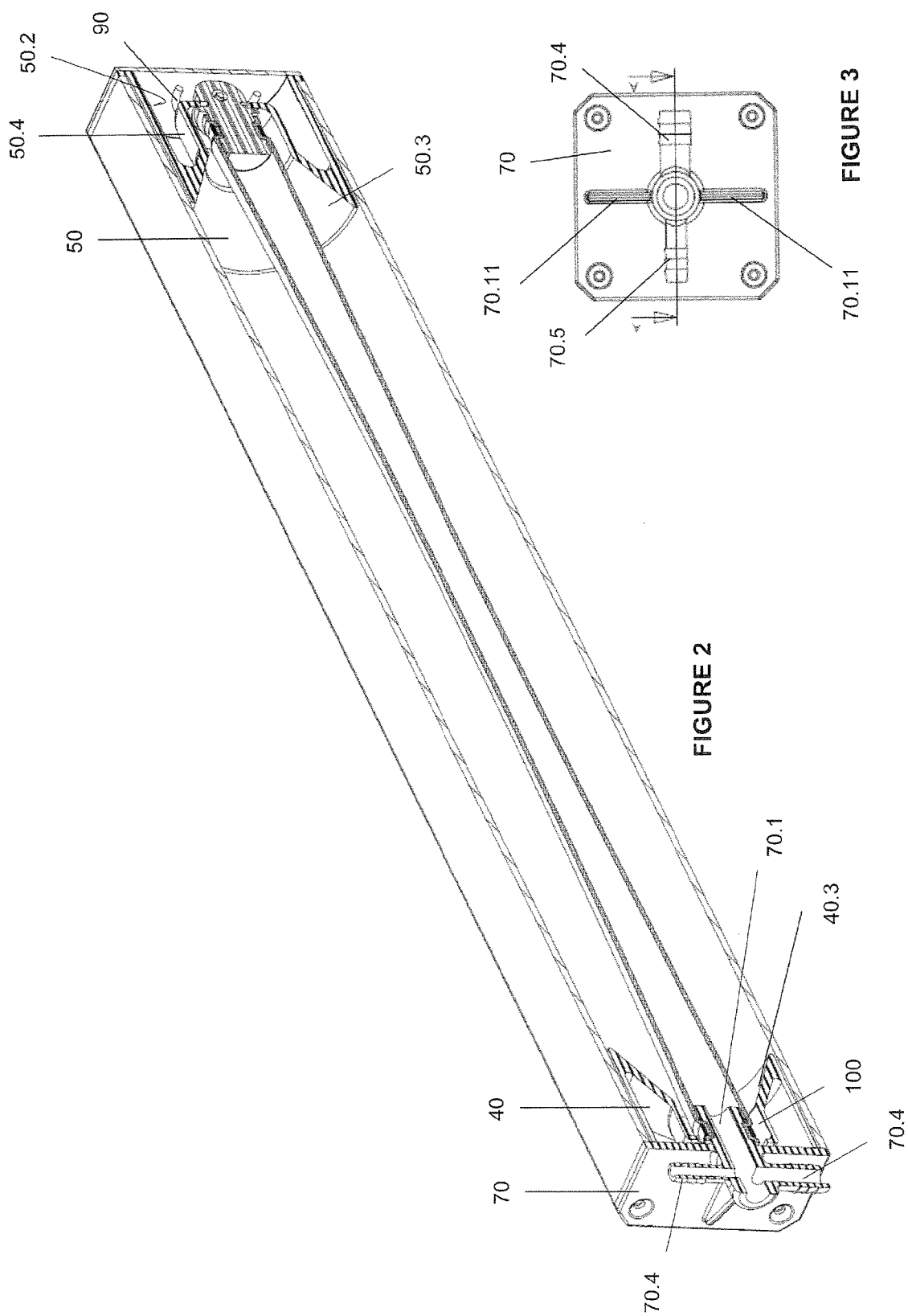

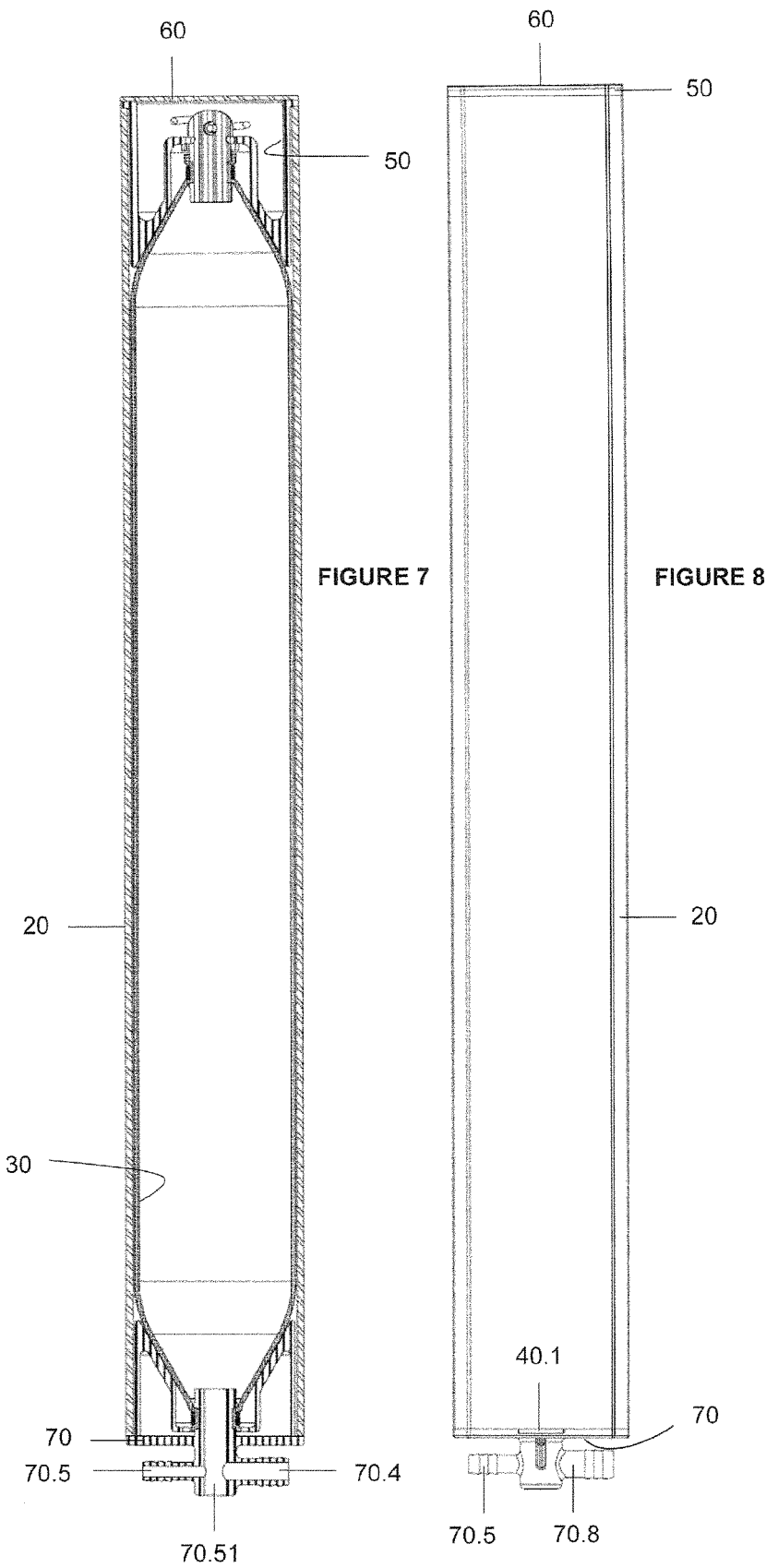

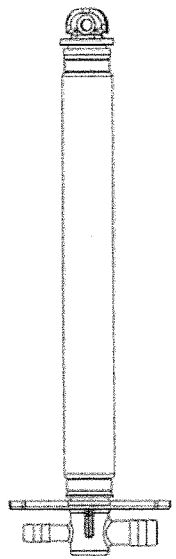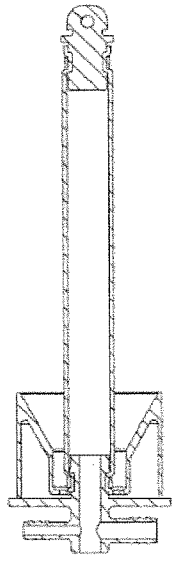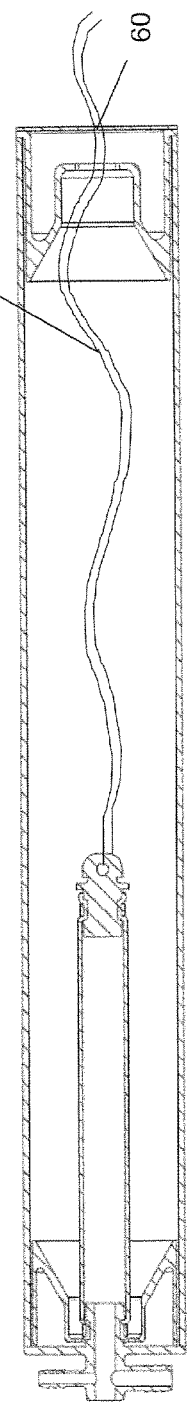
FIGURE 13 — STEP 1: INSERT TOP AND END PLUGS IN TO THE TUBE AND THE CRIMP BOTH ENDS WITH METAL CRIMPS.
FIGURE 14 — STEP 2: SLIDE THE SUB-ASSEMBLED TUBE TROUGH THE TOP INNER CAP
FIGURE 15 — STEP 3: FIT THE SUB-ASSEMBLED TUBE IN TO THE EXTRUDED HOUSING
FIGURE 16 — STEP 4: PULL THE RUBBER TUBE TROUGH THE INNER END CAP AND LOCK WITH A LOCK PIN

FLUID RESERVOIR AND DISPENSING DEVICE

FIELD OF THE INVENTION

The present invention relates to fluid reservoirs and storage dispensing devices which also include portable pressure storage vessels.

BACKGROUND OF THE INVENTION

There is a need for fluid reservoirs and storage dispensing devices which can be used to store fluids under pressure and which can then be used to dispense them.

Any reference herein to known prior art does not, unless the contrary indication appears, constitute an admission that such prior art is commonly known by those skilled in the art to which the invention relates, at the priority date of this application.

SUMMARY OF THE INVENTION

The present invention provides a fluid reservoir assembly of the type that can store and release fluid under pressure, the assembly having an outer body which enables an inner tube to be stretched and held between the ends of the outer body and the inner tube having an inlet and an outlet for a fluid to enter and exit the inner tube, wherein the inner tube is held stretched in the range of $(0.2 * \emptyset_{OB}/\emptyset_{IT})$ to $(2.0 * \emptyset_{OB}/\emptyset_{IT})$ times the at rest length of said inner tube, where $\emptyset_{OB}$ is the inside diameter or dimension of an aperture through outer body which is to contain the inner tube and $\emptyset_{IT}$ is the outside diameter of the inner tube when measured at rest and forming a circle.

The inner tube can be held stretched in the range of $(0.7 * \emptyset_{OB}/\emptyset_{IT})$ to $(1.3 * \emptyset_{OB}/\emptyset_{IT})$ times the at rest length of said inner tube.

The outer body can be formed from an open ended tube.

The present invention also provides a liquid reservoir assembly of the type that can store and release a fluid under pressure, the assembly having an outer body formed of an open ended tube which is closed by end formations which engage respective ends of the open ended tube and are held stationary with respect to the open ended tube, the end formations holding between them an elongated elastic inner tube sealing secured to the ends, the elastic inner tube being axially pre-tensioned or stretched from its natural or rest state, and sealingly secured to the ends in the pre-tensioned or stretched condition.

The open ended tube can have a central through aperture which is of substantially constant cross section along its length.

Alternatively, the open ended tube has reduced diameter apertures at its ends and a larger diameter intermediate section.

The open ended tube can be closed by end formations which engage respective ends of the open ended tube, and are held stationary with respect to the open ended tube.

The end formations can hold between them the inner tube.

The inner tube can be secured at one end to an inlet fitting; and at the other end to an outlet fitting.

Alternatively the inlet and the outlet can be formed in a single fitting connected to one end of the inner tube.

The other end of the inner tube can be closed off by a plug fitting to which the inner tube is securely and sealingly attached.

The open ended tube or the end formations can include a shaped portion which engages the inner tube when it expands and which prevents the inner tube from expanding in an axial direction.

The outer body can include connection means for the joining of the outer body to a like constructed outer body.

The connection means can be comprised of shaped channels or ribs which extend along the outer body.

The connection means can be located on the outer body at equi-spaced locations around the body.

The outer body can have a generally circular outer shape in cross section.

Alternatively the outer body can have a generally square or rectangular outer periphery in cross section.

The outer body can be manufactured from one of the following: a polymeric material; a metal; a composite material.

A fluid reservoir assembly as claimed in any one of the preceding claims wherein the outer body is made by a process of moulding or extrusion.

The fluid reservoir assembly can be modular in nature.

The fluid reservoir assembly can be adapted to be connected in series or parallel with one or more like assemblies to form an amalgamated reservoir system.

The present invention also provides a fluid dispensing apparatus for receiving a fluid under pressure and being able to release the fluid as required by an operator, the apparatus having one, or more than one fluid reservoir assembly as described above.

The fluid dispensing apparatus can include one or more fluid reservoir assemblies being held within or between a first and a second end cap.

The at least one of the fluid reservoir assembly can screw into a one of the first or second end caps.

The end caps can allow the apparatus to rest on a flat surface in a generally horizontal or a generally vertical orientation.

One or both of the end caps can include one or more than one of the following: a handle; an inlet and or an outlet port; a means to receive and or secure a handle; a means to receive and or secure an end of the at least one of the fluid reservoir assemblies.

The fluid dispensing apparatus can be for one or more of the following purposes: storing and or dispensing water or other liquids; storing and or dispensing herbicide and or pesticide; storing and or dispensing energy of a fluid under pressure; storing and or dispensing energy of a liquid under pressure; storing and or dispensing energy of a gas under pressure.

BRIEF DESCRIPTION OF THE DRAWINGS

A detailed description of a preferred embodiment will follow, by way of example only, with reference to the accompanying figures of the drawings, in which:

FIG. 2 illustrates a cross section through a fluid reservoir assembly which is assembled from the components of FIG. 1;

FIG. 3 illustrates an end view of the assembly of FIG. 2;

FIG. 7 illustrates a longitudinal cross section of the assembly of FIG. 2, where the inner tube is in a charged condition;

FIG. 8 illustrates a side view of the assembled fluid reservoir;

FIGS. 13 to 16 illustrate a series of cross sectional views showing a method of assembling the fluid reservoir assembly of previous figures;

DETAILED DESCRIPTION OF THE EMBODIMENT OR EMBODIMENTS

Figure 1:
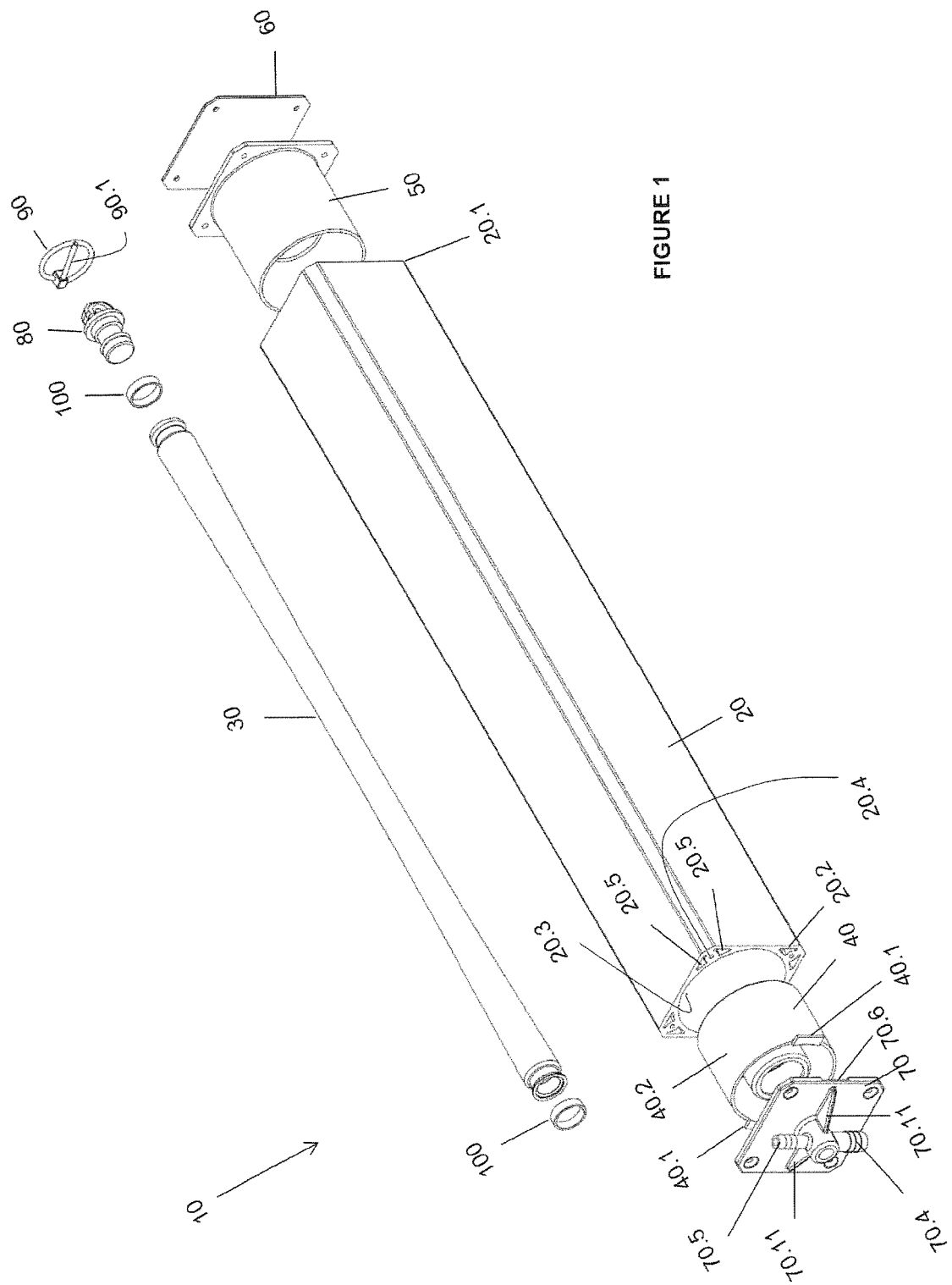
FIG. 1 illustrates an exploded perspective view of a fluid reservoir prior to assembly.

Illustrated in FIG. 1 is a fluid reservoir assembly 10, of the type that can store and release fluid under pressure. The assembly 10 has an outer body 20 which enables an inner tube 30 to be stretched and held between the ends 20.1 and 20.2 of the outer body 20. The inner tube 30 has connection with an inlet and an outlet fitting 70 for fluid to enter and exit the inner tube 30, with the inner tube 30 being held stretched in the range of $(0.2*\varnothing_{OB}/\varnothing_{IT})$ to $(2*\varnothing_{OB}/\varnothing_{IT})$ times the at-rest length of said inner tube, or $(0.7*\varnothing_{OB}/\varnothing_{IT})$ to $(1.3*\varnothing_{OB}/\varnothing_{IT})$ times the at-rest length of said inner tube;

where:

$\varnothing_{OB}$ is the inside diameter or dimension of aperture 20.3 through the outer body that is to contain the inner tube 30; and $\varnothing_{IT}$ is the outside diameter of the inner tube when measured at rest and forming a circle.

As discussed below this will provide in the samples tested, where the inside diameter of the aperture 20.3 is approx. 60 mm and the inner tube 30 is approximately 25 mm in outside diameter, a stretch factor of The material of the inner tube 30 can be any appropriate material, but an example of one includes that manufactured under the HYPERFORM brand having formulation HT-2600. This polymeric tubing has a base polymer which is a styrenic based thermoplastic elastomer. This polymer has the following typical physical properties: tensile strength 2100 psi; ultimate elongation 790%; 100% modulus 100 psi; 300% modulus 195 psi; 500% modulus 600 psi; tear 150 pound per lineal inch; density 0.9 gm/cm$^3$; melting temperature 380

° F.; durometer 32-38 Shore A. Other key characteristics include: talc free; does not contain natural rubber latex; compression set good; abrasion resistance good; weather resistance fair to good; ozone resistance good; odour minimal to none; sterilization gamma or ethylene oxide; colours can be various. SAFETY TESTING: includes ISO10993 Testing (available upon request): cytotoxicity, ISO maximization sensitization, ISO intracutaneous.

The outer body 20 is formed from an open ended tube which has a main aperture 20.3 which extends the whole way through outer body 20. The main aperture 20.3 is centrally located and is of substantially constant cross section along its length. The aperture 20.3 is of circular cross section.

The outer body 20 also includes two through apertures 20.4 at each corner of the generally square shape, which are provided so as to reduce the amount of material in the extruded body 20. Also included is another through aperture 20.5, which provides an aperture to receive screws, such as self-tapping screws, so as to secure end plate fitting 70 and formation 40 and end formation 50 and end plate 60 in place at opposite ends of the outer body 20, to complete the assembly.

The open ended tube 20 is closed by the end formations in the form of end plate fitting 70 and formation 50, which engage respective ends 20 and 20.2 of the open ended tube 20, and are held stationary with respect to the open ended tube 20.

Figure 4:
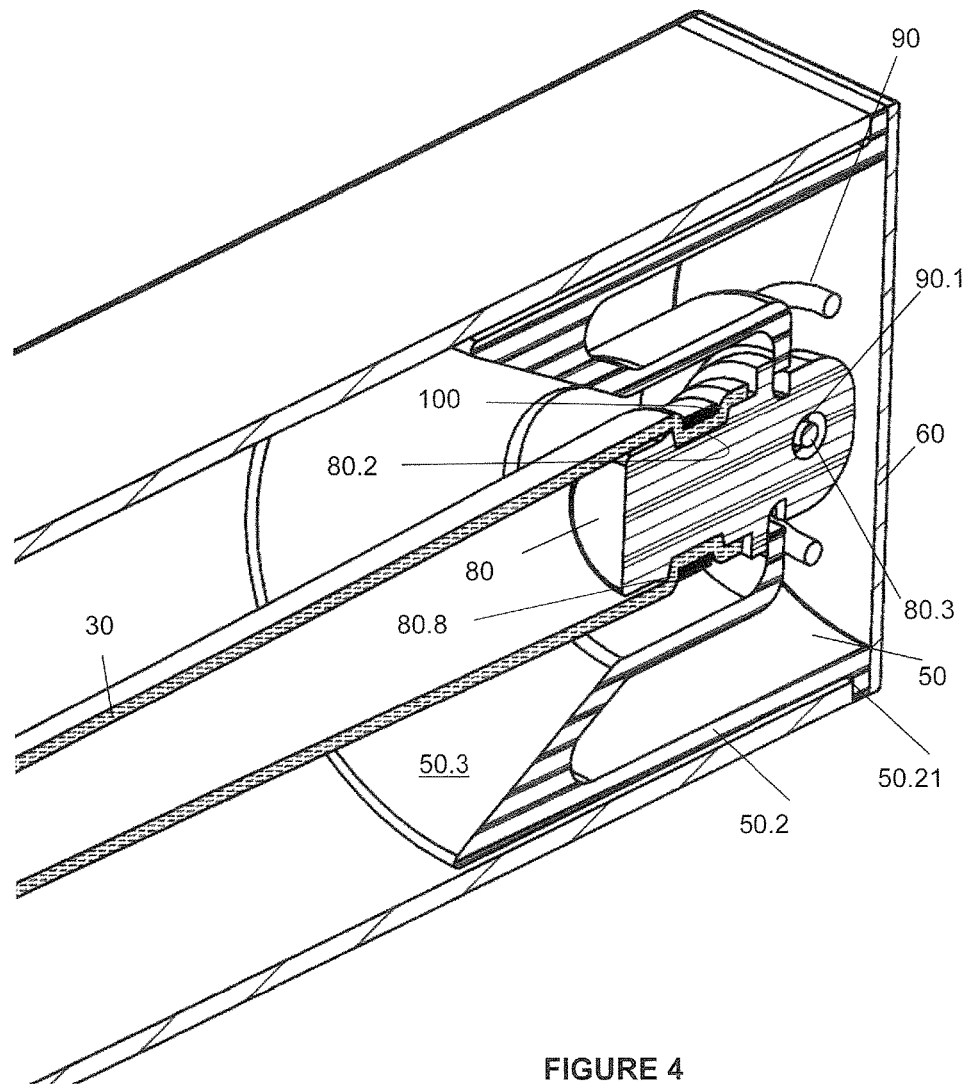
FIG. 4 illustrates a detailed perspective view of the plugged end of the assembly of FIG. 2.
Figure 5:
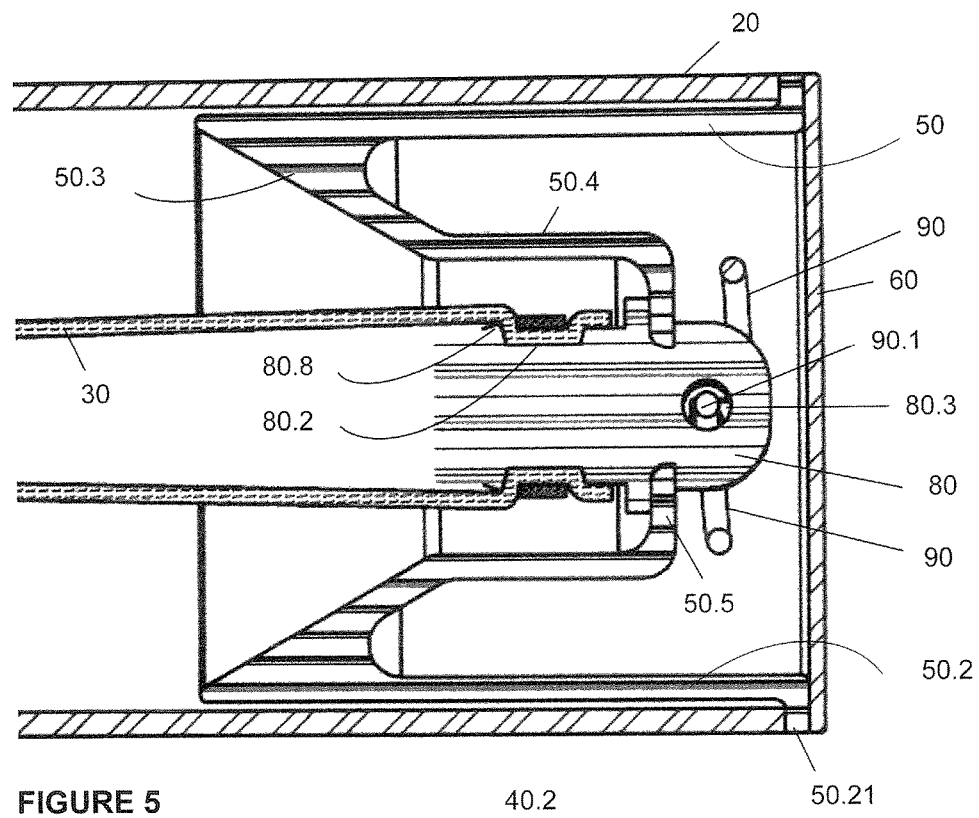
FIG. 5 illustrates a detailed cross section through the plugged end of the assembly of FIG. 2.
Figure 6:
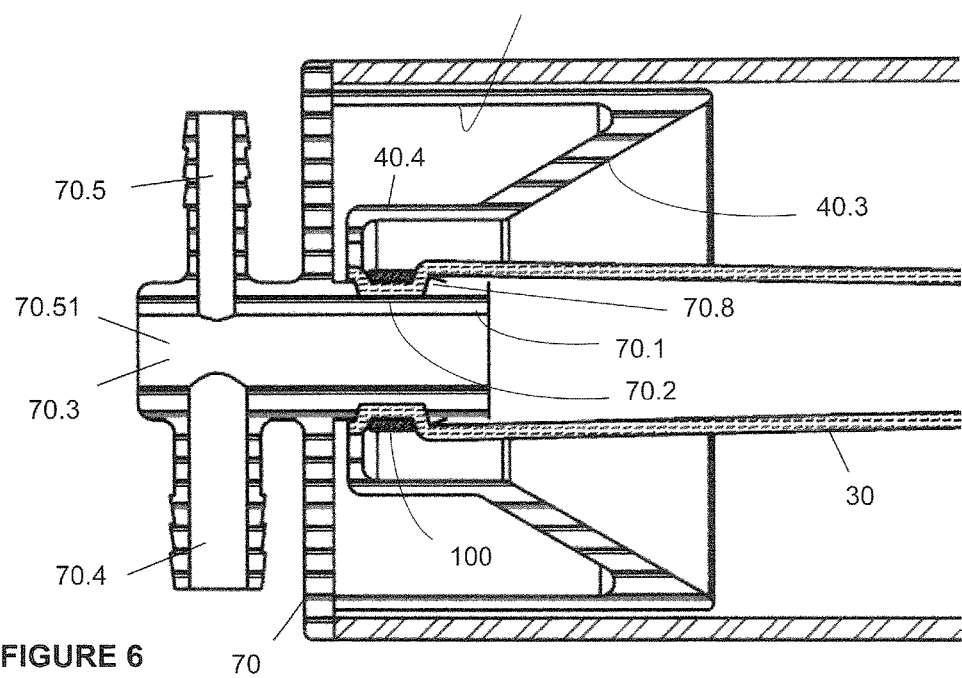
FIG. 6 illustrates a detailed cross section through the inlet and outlet end of the assembly of FIG. 2.
Figures 9, 10:
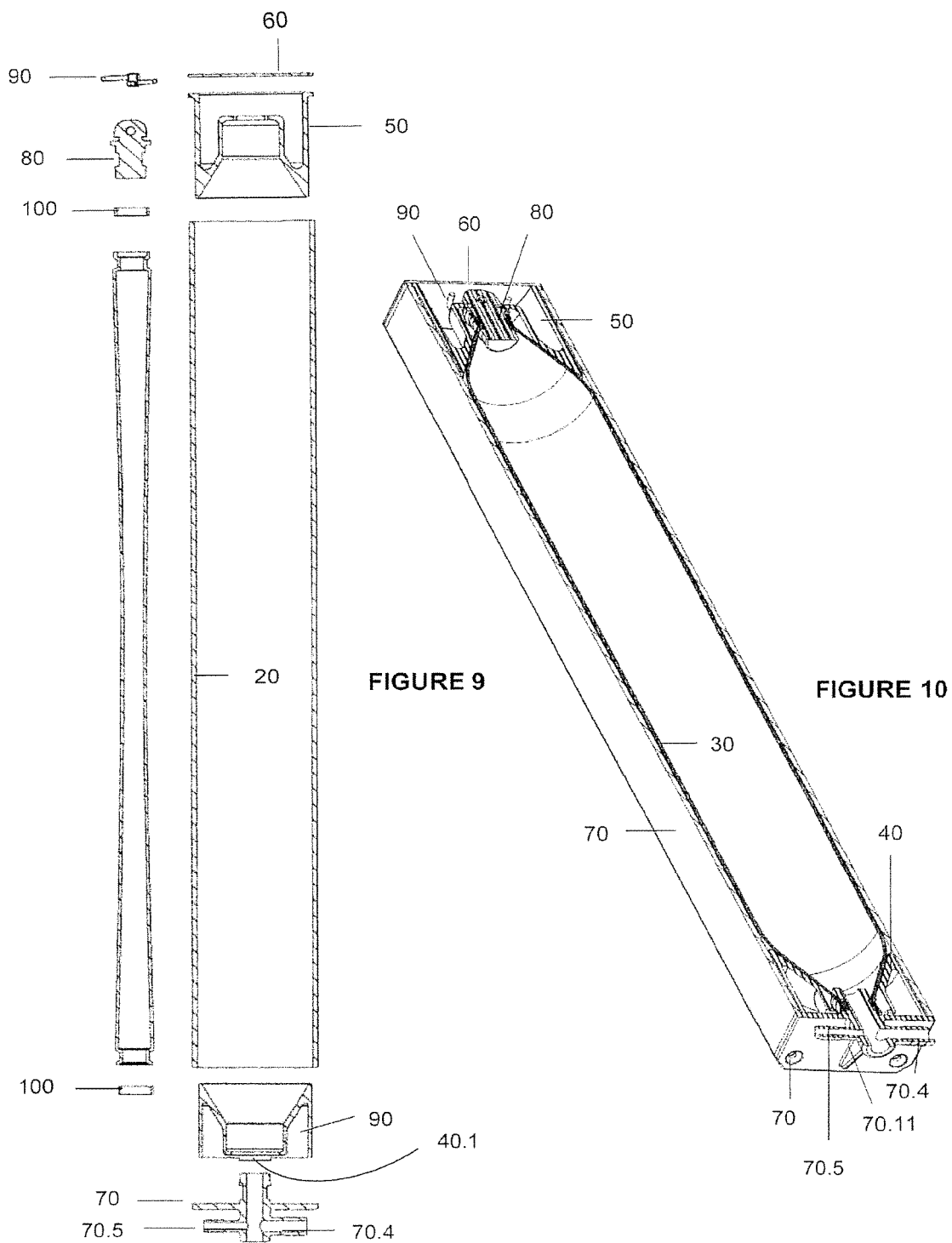
FIG. 9 illustrates a cross section through the components of FIG. 1.
FIG. 10 illustrates a perspective view of the cross section of FIG. 7.

As best seen from FIGS. 4 to 6, the end plate fitting 70 has an internal port formed from a hollow spigot 70.1 with a reduced external diameter section 70.2 so as to sealingly and securely hold the end of the inner tube 30, as best seen in FIG. 6. The opposite end of the inner tube 30 is closed off and sealingly held or secured to the other end of the open ended tube 20, by a solid plug 80, as is best illustrated in FIG. 5, and will be described in more detail below.

The fitting 70 includes a circumferential barb 70.8 located inwardly from the reduced diameter section 70.2, so that this barb 70.8, interacting or cooperating with the metal clamping ring 100, will be able to achieve a seal which will allow the inner tube 30 to be pressurised with liquid or gas, to a designed for pressure. In the case of the intended use as a water supply, this pressure would be that of mains pressure or similar.

The plug 80 has a similar reduced diameter section 80.2 and a circumferential barb 80.8, which together with the metal crimping or clamping ring 100, will provide an appropriate seal for the designed for pressure.

It will be noted that the end fitting 70 interacts with an inner formation 40, which has engaging flanges 40.1 which will sit inside of matching grooves 70.6 when the two are assembled together. This assists in preventing the rotation of the formation 40, and keeps its outboard end located at the outer rim of the open ended tube 20.

The formation 40 includes a cylindrical outer portion 40.2 from which inwardly extends a converging conical surface 40.3, which terminates in a neck portion 40.4 which surrounds the area of connection of the inner tube 30 to the fitting 70. The conical formation 40.3 provides a shaped bearing surface against which the inner tube 30 charges against or expands against, when in use.

In a likewise fashion, the other end formation 50 also includes a cylindrical outer body 50.2 which allows it to be received snugly into the aperture 20.3 of outer body 20, and because of the presence of the external flange 50.21, it is prevented from being drawn into the outer body 20 when assembled, under the bias or urging from the pre-stretched inner tube 30.

The end formation 50 also includes a diverging conical surface 50.3 which terminates in a neck portion 50.4 which provides a rearward or bottom flange 50.5, against which the lock pin 90 has its pin section 90.1 bearing against to keep the fitting 70 and plug 80 spaced apart in the assembly and with the appropriate pre-tension or pre-stretching applied to the inner tube 30 once assembled and in use.

The inner tube 30 is described above as being exemplified as being manufactured from styrenic based thermoplastic elastomer, however, if required it could also be manufactured from rubber or latex and preferably of high quality rubber or latex which has an extension limit before failure of the order of 600% to 800%.

It will be noted that the end fitting 70 has three outer apertures or ports formed in it. A central main aperture 70.51 is provided so that a fill level indicator can be positioned therein, or alternatively a pressure relief valve can be positioned therein or a valve body which will do both functions. The other outer apertures or ports are an port 70.4 and an port 70.5 which are formed in the fitting 70. The fitting 70 is prevent from entering the outer body 20 by being secured to the end 20.2 of the outer body 20. The port 70.4 can serve as an inlet and ensures that when filling the inner tube 30 from a higher pressure source such as mains pressure water, that the inner tube 30 will fill at a relatively fast pace. Whereas by the port 70.5 being of a generally smaller diameter, this, if used as an outlet, can assist to control the outlet flow of water from the inner tube. The smaller in diameter port 70.5 also allows connection to like reservoirs assemblies 10.

Two webs or gussets 70.11 brace and extend away from the spigot on and in which the ports 70.51, 70.4 and 70.5 are formed. The webs or gussets 70.11 provide lateral strength and bracing which may otherwise cause breakage, if a force perpendicular to the line of extension of the ports 70.4 and 70.5 were applied to the spigot.

Figure 11:
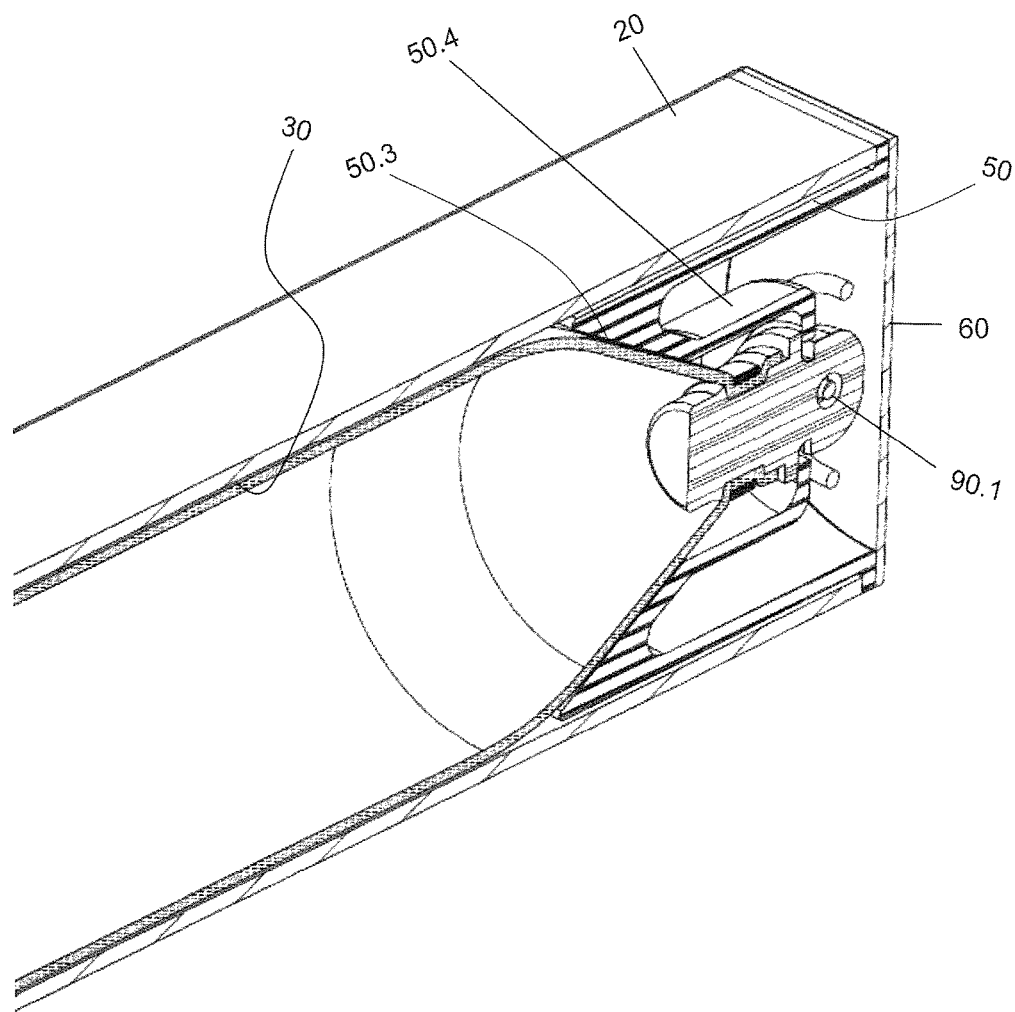
FIG. 11 illustrates a perspective view similar to FIG. 4 where the inner tube is in an charged condition.
Figure 12:
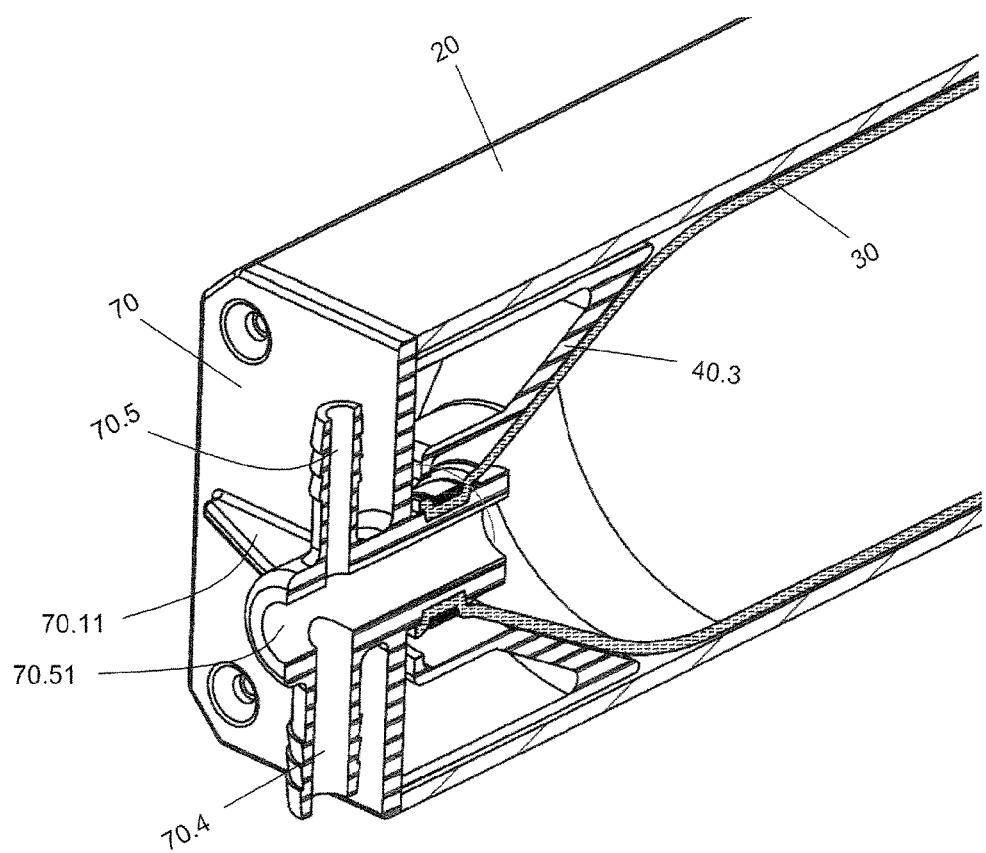
FIG. 12 illustrates a detailed cross sectional perspective view of the inlet/outlet end of the assembly where the inner tube is in a charged condition.

The end formations 40 and 50 each have their shaped portions being conical surfaces 40.3 and 50.3 which engage the inner tube 30 when it expands as is illustrated in FIGS. 7, 11 and 12 to prevent the inner tube 30 from expanding in an axial direction. In the area of the inside of the neck regions 40.4 and 50.4, the unsupported length of the inner tube 30 is relatively small in length, and thus no axial extension of the inner tube 30 into the neck will occur in use.

The outer body 20 illustrated in FIGS. 1 to 16, shows a relatively smooth sided or planar outer periphery of the outer body 20. The generally rectangular or square outer periphery in cross section of the outer body 20, results in the ability to place several similarly shaped outer bodies 20 together in an amalgamation, to collocate several assemblies 10 together. This modular nature of the assemblies 10, means that such assemblies 10 can be themselves assembled in shapes as required, and in numbers as required, in relatively neat packages of assemblies, which can then be connected in series or parallel with each other so as to provide a portable supply of the liquid or gas contained in the inner tube 30.

As is illustrated in FIG. 1, 2, 9 or 16, where the pre-stretch or pre-tension is applied to the inner tube 30, the un-charged state of the inner tube 30 is, due to the pre-stretching, of lesser volume or a has a central necked portion of lesser volume, which means that more liquid or gas evacuates from the inner tube 30, than would otherwise occur if the tube 30 were not pre-stretched or tensioned. The pre-stretching also provides a generally constant pressure outflow of stored liquid or gas until the inner tube 30 returns to the unchanged, pre-stretched state. Additionally, the pre-stretching ensures that the inner tube 30 will not grow axially more than some 5% to 10%. This leads to an advantageous effect, in that with pre-stretching in the range of some 110% to 250%, as the first location of radial expansion of the inner tube 30 under pressure cannot be controlled or predetermined without weakening or forming a pre weakened area in the tube; it ensures that the reservoir assembly will properly work, because axial expansion of more than 5% to 10% will ensure that the wall of the outer body aperture 20.3, will interfere with the inner tube 30's expansion. That is the inner tube 30 won't inadvertently grip the wall of the aperture 20.3, nor will the inner tube 30 kink while it is being filled or releasing the water under pressure.

As is illustrated in FIGS. 13 to 16, the process or method of assembling the components of the assembly 10 is described as follows. The fitting 70 is first assembled to the inner tube 30 by means of the metal crimp or clamp ring 100, together with the plug 80 also being secured to the other end of the inner tube 30 with a respective metal crimp or clamp 100.

Once this sub-assembly has been done, the end formation 40 is engaged with the inner face of the fitting 70. Then this sub assembly is ready to be placed into the end 20.2 of the outer body 20. However, a cable or filament 300 is threaded through the hole 80.3 in the plug 80, and this filament 300 is then threaded through the end formation 50 which is loosely positioned in the other end 20.1 of the outer body 20. By holding the outer body 20 stationary while drawing through the cable 300, the plug 80 will pass through the aperture in the neck 50.4, thereby stretching the inner tube 30. By then placing the pin 90.1 into the hole 80.3, and thus can be brought to rest against the outer flange 50.5. Once in this condition, the tension can be brought off the filament 300, and the filament or cable 300 removed from the plug 80. Once so assembled, the end cap 60 can be screwed into place on the end of the outer body 80, while the fitting 70 can be likewise secured to the other end 20.2 of the outer body 20, both by self-tapping screws—not illustrated, to complete the assembly 10.

Figure 17:
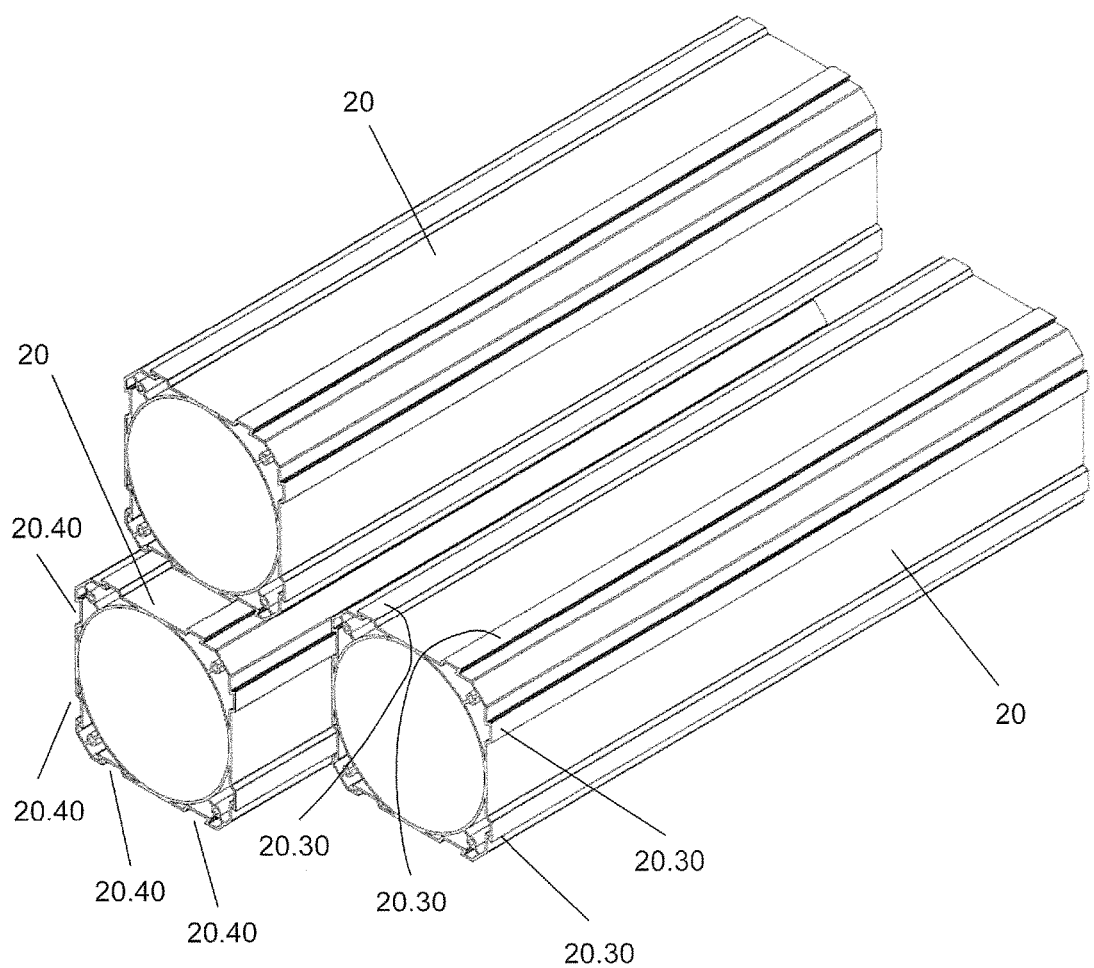
FIG. 17 illustrates a perspective view of a plurality of outer bodies of the fluid reservoir assembly showing them connected so as to form an amalgamation of assemblies.
Figure 18:
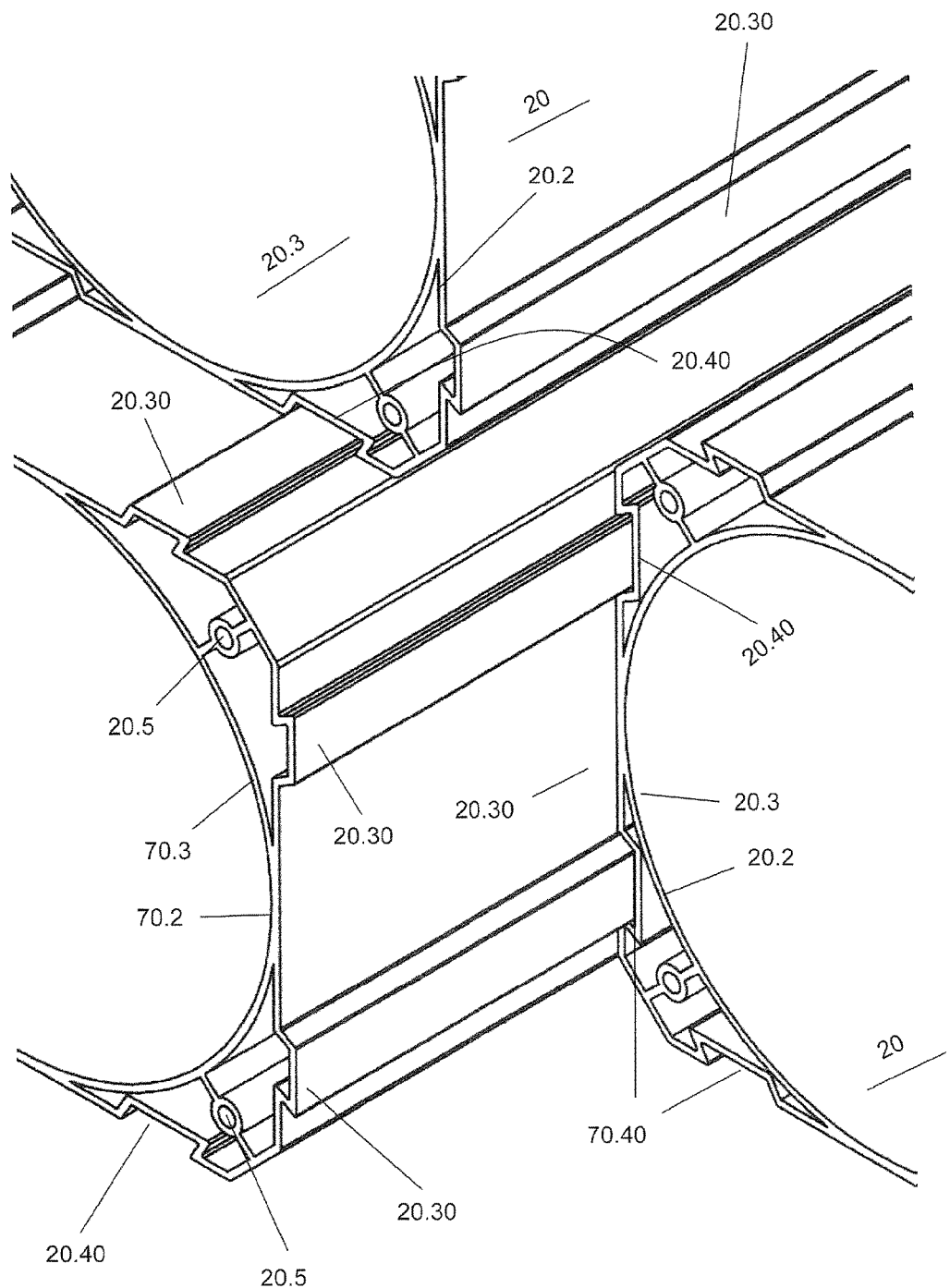
FIG. 18 illustrates a detailed perspective view of a portion of FIG. 17, to illustrate formations which allow modular inter-connection of outer bodies of like fluid reservoir assemblies.

In another embodiment, as is best viewed in FIGS. 17 and 18, the outer body 20 includes a series of connection formations in the form of ribs 20.30 on the upper and right sides of the outer body 20, with mating grooves or channels 20.40 on the lower and left sides of the outer body 20, so that side and upper and lower assemblies 10 can be joined together into a workable and manageable package to provide a predetermined amount of liquid or gas to be dispensed. Such a manageable package may be for positioning or mounting in a back pack, or possibly in a trailer or rear tray of a truck or utility vehicle.

The mating channels and ribs 20.30 and 20.40 also extend along the length of the outer body 20. These can provide a degree of rigidity to the shape of the outer body, by comparison to a generally planar surface. Further these ensure that only relatively thin sections need be provided, and this makes them particularly amenable to forming in aluminium, and by an extruded process, making the outer bodies relatively inexpensive to manufacture.

The connection means in the form of the ribs and channels 20.30 and 20.40 are equi-spaced on and around the outer body 20, and have interlocking or matching shapes, which may be generally described as trapezoidal.

The preferred shape of the outer body 20 is a generally square shape whereby each of the four sides are approximately the same width, with a generally circular aperture 20.3 utilised. However, if a generally rectangular outer periphery in cross section were utilised, then an ovoid shaped aperture 20.3 could also be utilised to the same effect as a circular shaped aperture.

Other shaped apertures 20.3 can also be utilised, such as oval, octagonal, hexagonal, square, rectangular or triangular apertures 20.3 can be utilised. Whilst the formula at paragraph 042 is expressed in terms of the inside diameter of the aperture 20.3 of the outer body 20, as this is that aperture shape's critical dimension, it will be understood that this can be substituted by critical dimension of other shapes, which will tend to be the longest straight line dimension of such other shapes, as in the following:

| SHAPES | CRITICAL DIMENSION |
| --- | --- |
| Hexagonal, Octagonal or even number sided polygonal shapes | longest straight line distance between opposed apexes. |
| Square and Rectangular | Diagonal distance between apexes. |
| Triangular or odd number sided shapes | Longest straight line distance measured from a side to furthest apex. |
| Oval or Ovoid shapes | Major axis distance. |

The outer body 20 can be manufactured from one a polymeric material, or a metal such as aluminium or duralium, or if desired from an appropriate composite material. The outer body 20 is preferably made by a process of moulding or extrusion, but it is expected that extrusion will be the optimal process due to a significant cost advantage.

The fluid reservoir assembly 10 as described above is generally modular in nature which allows a number of them to be connected in series or parallel with one or more like assemblies 10 to form an amalgamated reservoir system.

These assemblies 10 can be the basis of a fluid dispensing apparatus for receiving a fluid under pressure and being able to release the fluid as required by an operator, the apparatus having one, or more than one, fluid reservoir assemblies 10 as described above. The apparatus can be for one or more of the following purposes: storing and or dispensing water or other liquids; storing and or dispensing herbicide and or pesticide; storing and or dispensing energy of a fluid under pressure; storing and or dispensing energy of a liquid or gas under pressure; storing and or dispensing energy of a gas under pressure.

While an open ended tube of constant cross section provides the outer body 20 in the above embodiments, it will be readily understood that the open ended tube can have reduced diameter apertures at its ends to provide the same function as the conical surfaces 40.4 and 50.4 of the above embodiments. The intermediate section of such an outer body will have a larger diameter. Such an outer body 20 might be produced by moulding or blow moulding and can provide a relatively inexpensive reservoir assembly.

While the above embodiments have the inlet and exit both in the end fitting 70, it will be understood that the inner tube can be secured at one end to an inlet fitting and at the other end an outlet fitting provided, so that fluid enters the inner tube 30 at one end and leaves the inner tube 30 at the other end.

While a straight sided figure such as a square, rectangle or for that matter a triangle, octagon etc. is preferred for the outer peripheral cross section of the outer body 20, it will be readily understood that the outer body can be an appropriate shape, including circular if required. This may make side by side assembly not as readily adaptable, but by providing connection means in the form of the ribs and channels like those of 20.30 and 20.40, being equi-spaced on and around the outer body 20, a suitable joining system will result.

While the above describes some materials for some of the components, it will be readily understood that any appropriate combinations of materials can be utilised. Thus the end fitting 70, the formation 40, the outer body 20, the formation 50, end plate 60 and or the plug 80 can be of any appropriate polymeric or metal material, and various combinations of these, for cost, weight or other reasons, can be selected.

As examples of constructed assemblies that have been tried, an inner tube 30 of approx. 200 mm in length and having an outside diameter of 25 mm was selected, with a circular aperture 20.3 in the outer body or casing 20 having an inside diameter of 75 mm. The inner tube material had an ultimate elongation of 790% while the length of the outer body 20, from one end 20.1 to the other end 20.2, had a length 600 mm. The inner tube 30 was pre-stretch by a factor of 3 times, i.e. the 200 mm tube was stretched to the 600 mm casing or outer body 20's length. This resulted in a volume approximately 2.5 liters when full, and when cycle tested, reached 1100 cycles before breaking.

In a second example an inner tube 30 of approx. 250 mm in length and having an outside diameter of 25 mm was selected, with a circular aperture 20.3 in the outer body or casing 20 having an inside diameter of 60 mm. The inner tube material had an ultimate elongation of 790% while the length of the outer body 20, from one end 20.1 to the other end 20.2, had a length 600 mm. The inner tube 30 was pre-stretch by a factor of 2.4 times, i.e. the 250 mm tube was stretched to the 600 mm casing or outer body 20's length. This resulted in a volume approximately 1.6 liters when full, and when cycle tested, reached approximately 4000 cycles before breaking.

The formula for the amount of stretch can be re arranged so as to determine the at-rest length of an inner tube 30 required for a specified length of casing or outer body 20, having a specific diameter, or major dimension (as described above) where:

$L_{itp}$=the at-rest length of inner tube 30,
$L_{ob}$=length of casing or outer body 20;
$DIA_{it}$=diameter of inner tube 30 at-rest
$DIA_{ob}$=diameter of aperture 20.3 in casing or outer body 20.

Thus the at-rest length $L_{itp}$ of inner tube 30 required is in the range of:
($L_{ob} \times DIA_{it}/DIA_{ob} \ast 0.2$) to ($L_{ob} \times DIA_{it}/DIA_{ob} \ast 2$)
or more preferably in the range of:
($L_{ob} \times DIA_{it}/DIA_{ob} \ast 0.7$) to ($L_{ob} \times DIA_{it}/DIA_{ob} \ast 1.3$)
and even more preferably in the range of:
($L_{ob} \times DIA_{it}/DIA_{ob} \ast 0.9$) to ($L_{ob} \times DIA_{it}/DIA_{ob} \ast 1.1$)

Figure 20:
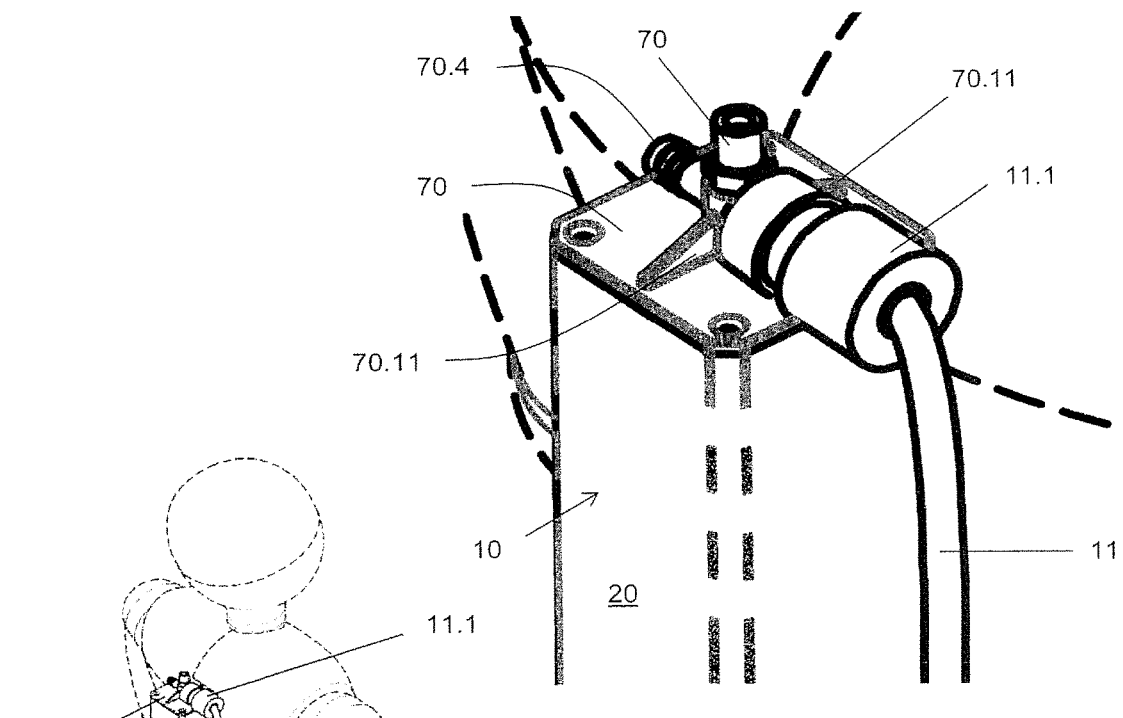
FIG. 20 illustrates a detail of a portion of FIG. 19.
Figure 19:
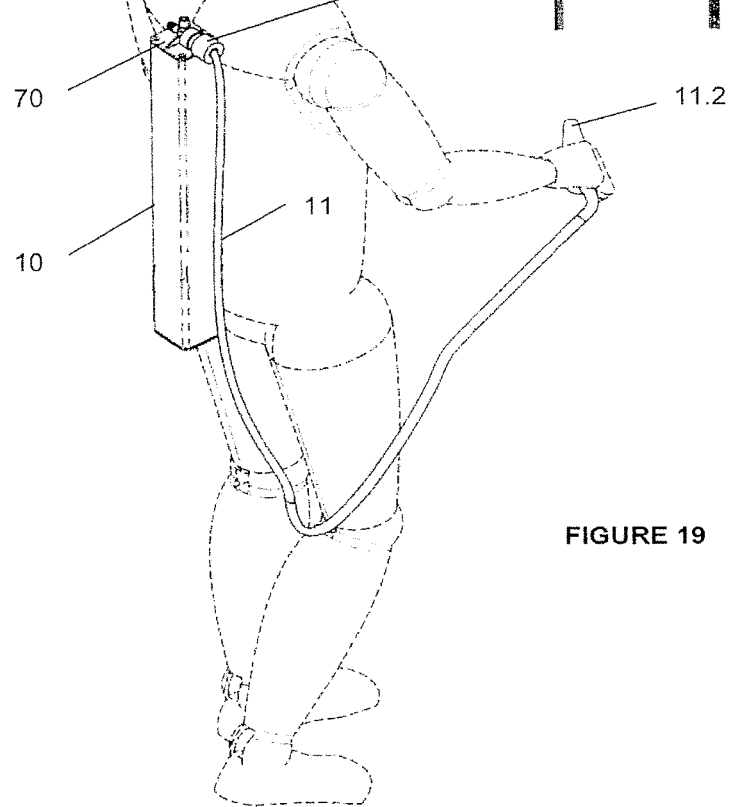
FIG. 19 illustrates a perspective view of the reservoir assembly of earlier figures mounted in a back pack arrangement on a user.

Illustrated in FIGS. 19 and 20 is an embodiment of the reservoir assembly 10 mounted in a back pack format to the back of a user. The reservoir assembly 10 includes an outlet connector 11.1 which connects to the outlet formation 70.5 and to which is connected a hose 11 at the other end of which is a selectively openable or closable nozzle 11.2. Once the nozzle 11.2 is closed and connector 11.1 is connected to the outlet port 70.5, the water pressure in the inner tube 30 is communicated to the nozzle 11.2, where the operator can selectively open it to spray or dispense water, or close it to stop the flow.

As is best illustrated in FIG. 20 the features of the fitting 70 are better illustrated. In this figure a pressure relief valve 70.53 is mounted inside the port 70.51 so that as the operator fills via inlet port 70.4, by connecting a mains pressure hose thereto, once a predetermined pressure is reached, the relief valve 70.53 can activate if needed.

Figure 21:
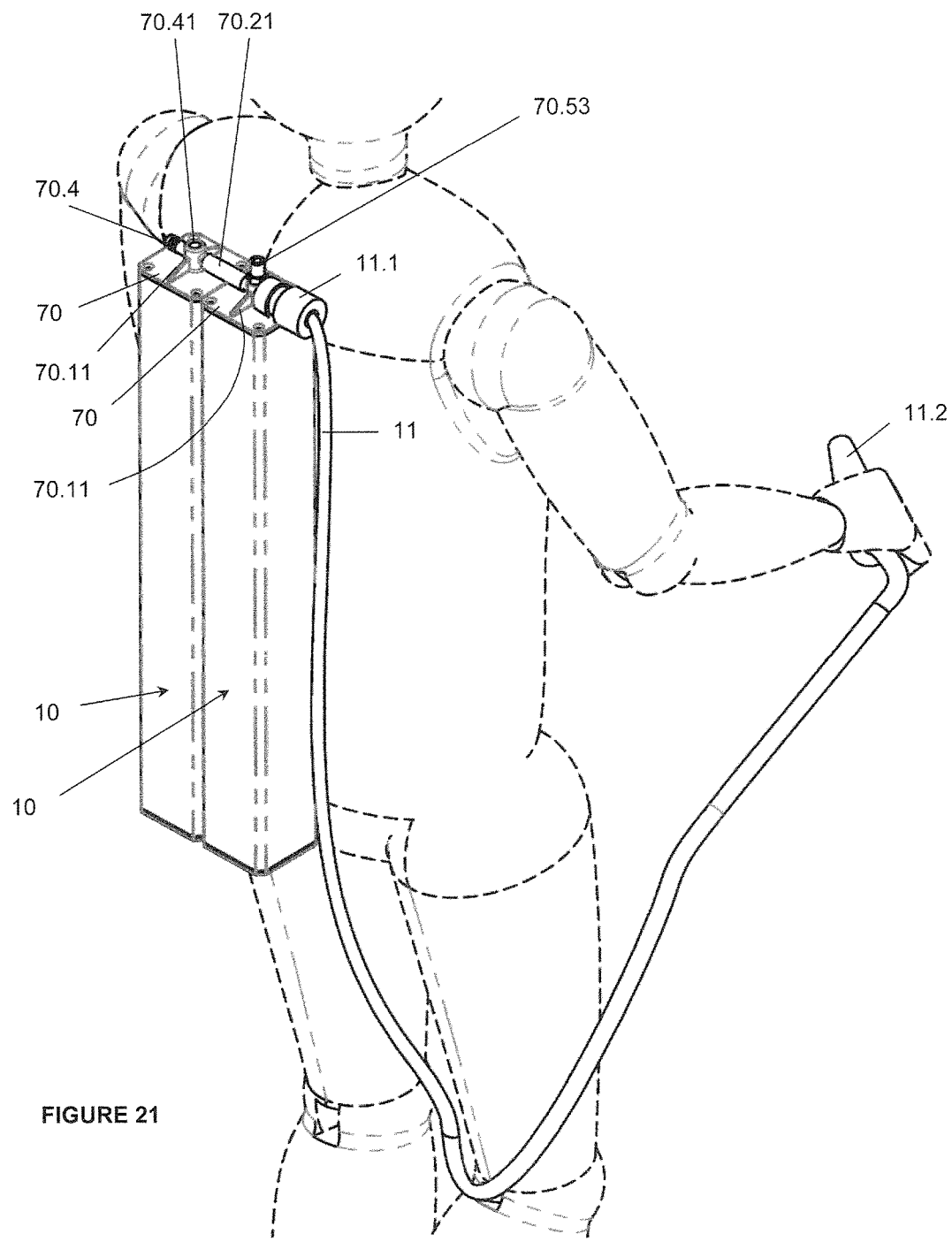
FIG. 21 illustrates a detail perspective view of an apparatus similar to that of FIG. 19, where two reservoir assemblies are connected in a back pack format.

Illustrated in FIG. 21 is a back pack version similar to FIG. 19, except that two assemblies 10 are in the back pack assembly. Each fitting 70 of respective assemblies 10, are interconnected in series by a tube 70.21 which connect the outlet port 70.5 on the left side assembly 10 to the inlet port 70.4 on the right side assembly 10. The right side assembly 10 receives the outlet connector 11.1 which delivers water via hose 11 to outlet nozzle and valve 11.2, while the left side assembly 10 has the inlet port 70.4 exposed so that the user can readily refill the series connected assembly.

It will be noted from FIG. 21 that the right hand side assembly 10 includes a relieve valve 70.53, while in the port 70.51 of the left side assembly 10 is a fill or level indicator 70.41. Alternatively the aperture 70.51 could be simply closed by an appropriate plug.

Figure 22:
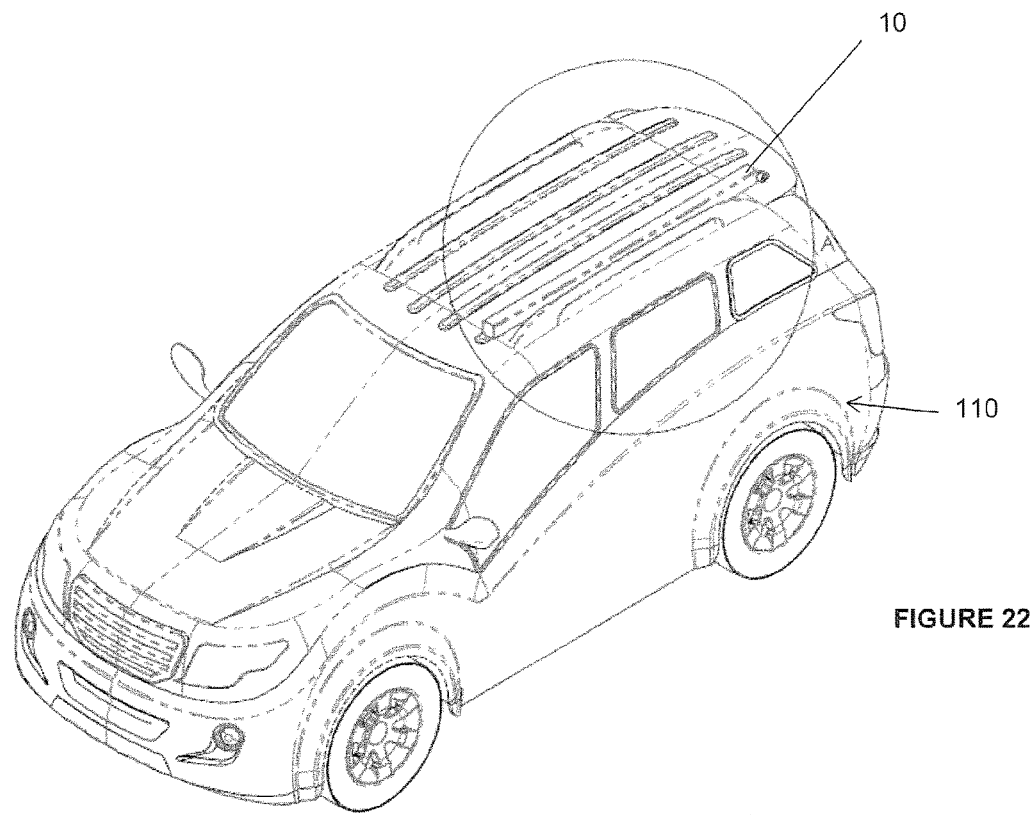
FIG. 22 illustrates a perspective view of a vehicle having a single reservoir assembly mounted to its roof.
Figure 23:
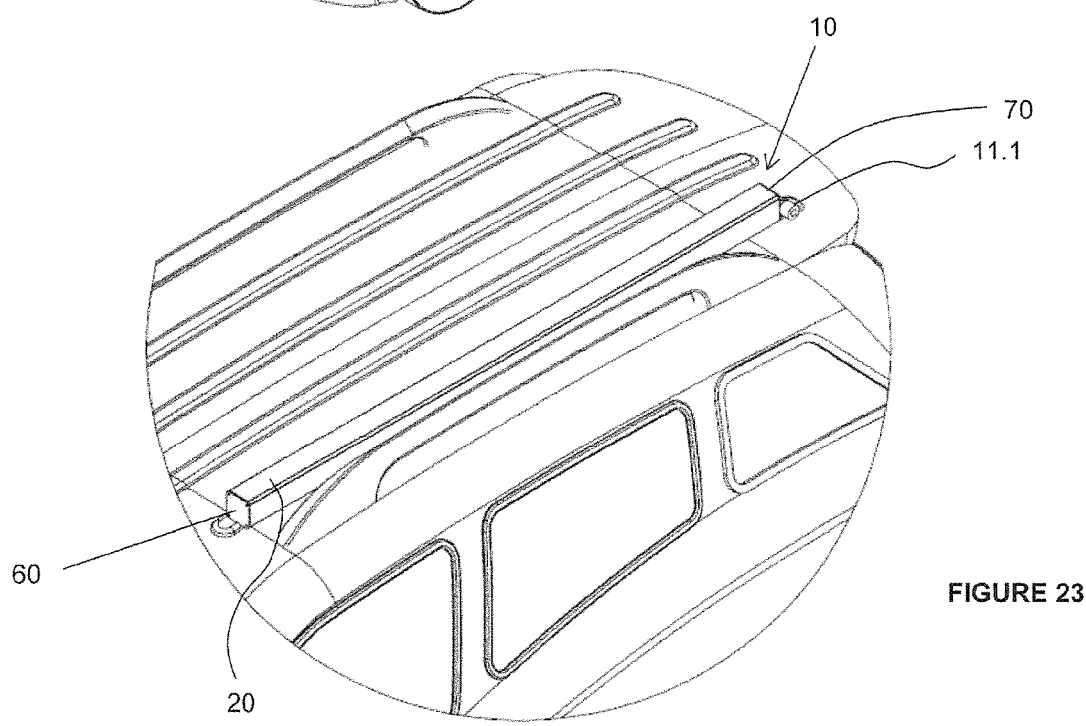
FIG. 23 illustrates a detail view of part of FIG. 22.
Figures 24, 25:
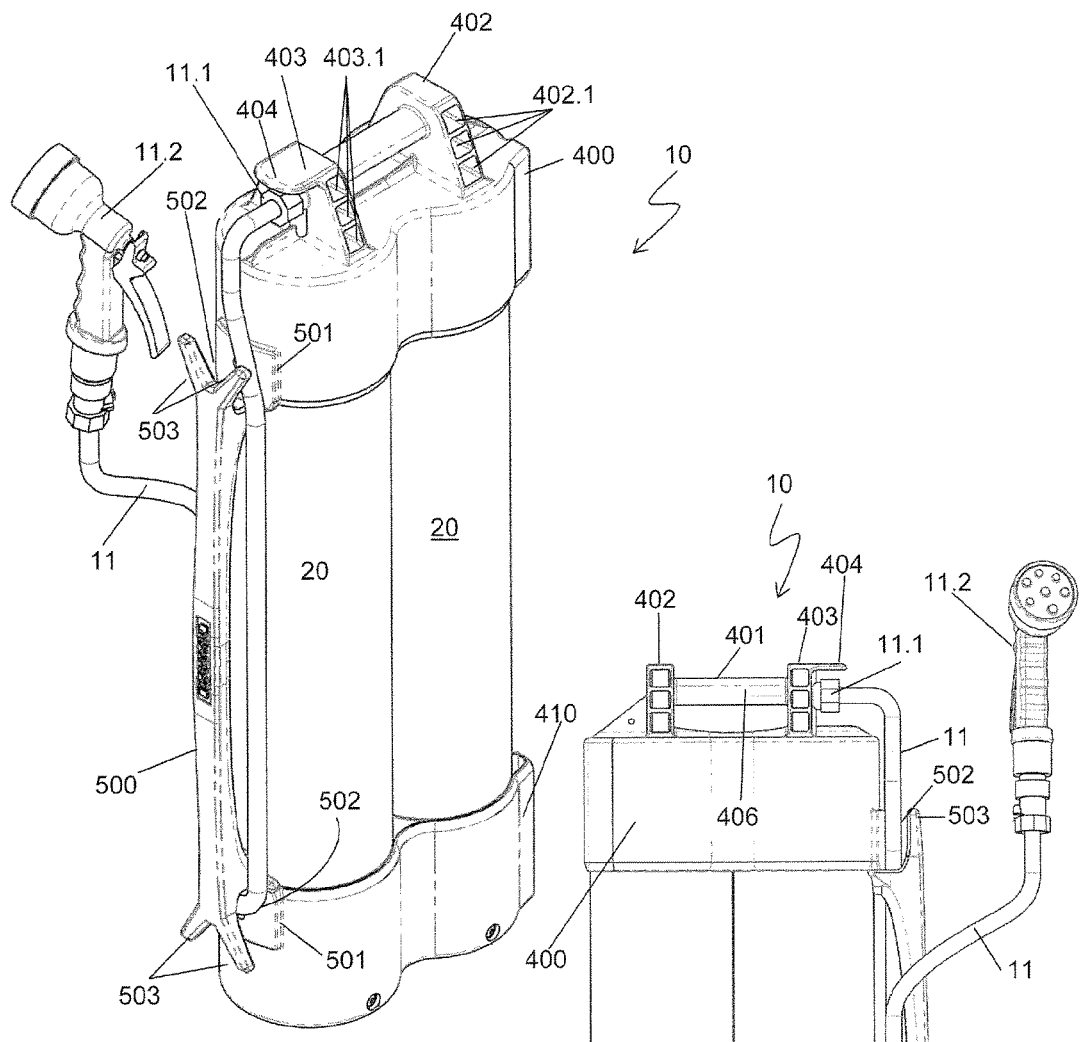
FIG. 24 illustrates a rear perspective view of another reservoir assembly with improved construction showing hose and nozzle connected.
FIG. 25 illustrates a front elevation of the reservoir assembly of FIG. 24.

Illustrated in FIGS. 22 and 23 is another embodiment of a reservoir assembly 10, which is mounted to the roof of a motor vehicle 110. The assembly 10 is significantly longer than the assembly 10 of previous embodiments, as the vehicle 110 is able to better carry larger amounts of water. As illustrated in FIG. 23, the out let connector 11.1 is located at the rear of the vehicle, and protected by the presence of the outer body 20. The embodiment of FIGS. 22 and 23 will be understood to be useful by tradespersons and campers and tourists so as to have access to a supply of water under pressure. It will be readily understood that multiple assemblies 10 can be mounted to the vehicle roof, in which case a series or parallel connections between the assemblies 10 can be provided, as illustrated in FIG. 21.

Illustrated in FIGS. 24 to 28 is another embodiment of a reservoir assembly 10, and like parts, having a like function to those described above with respect to earlier drawings, have like numbering.

The assembly 10 has two canisters 20, which are held in the upper cap 400 at their top, and in the base 410, as will be described in more detail below. The upper and lower caps 400 and 410 are connected together by a handle 500.

Figure 26:
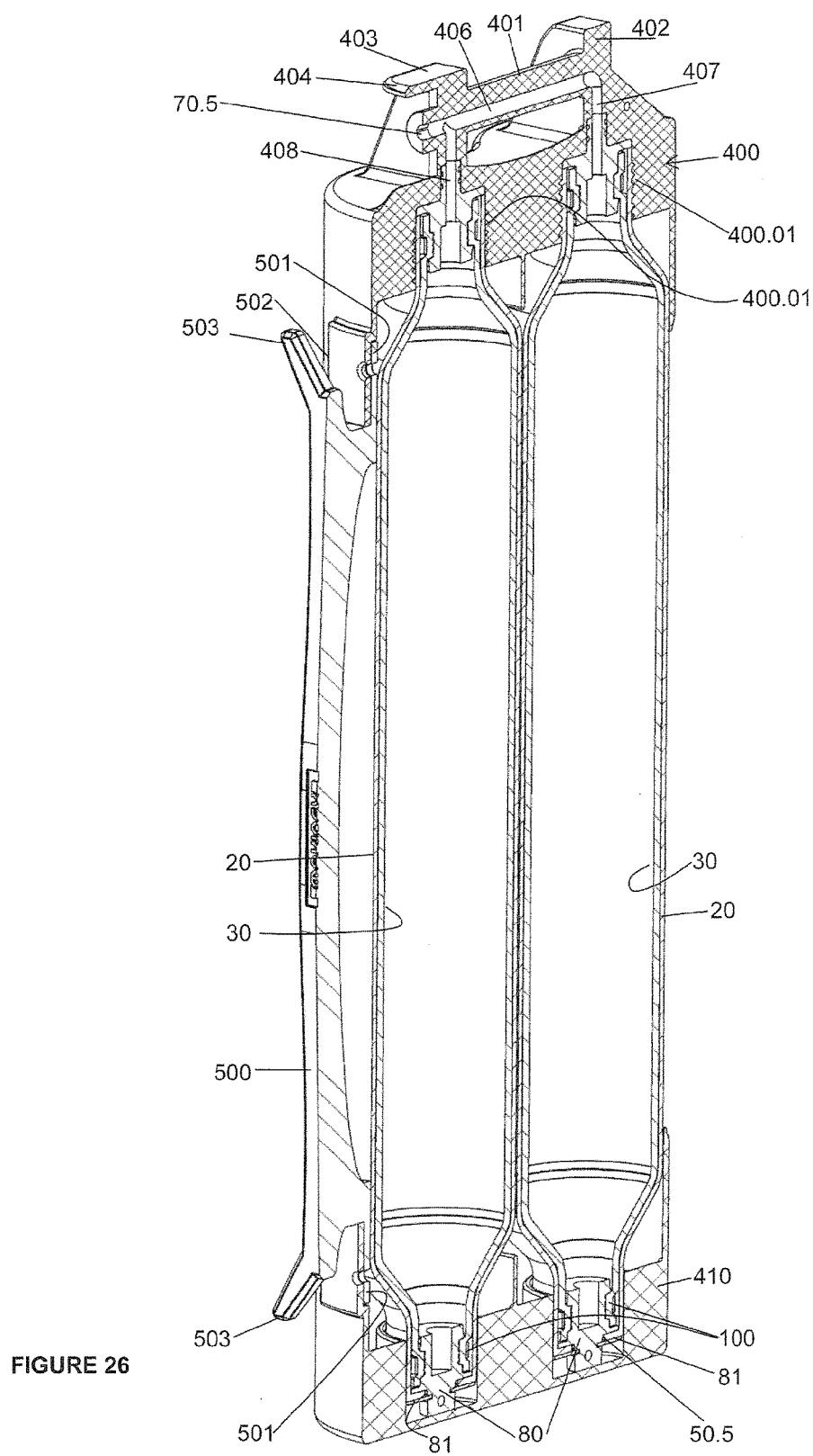
FIG. 26 illustrates a perspective cross section through the reservoir assembly, of FIG. 24 with the tubes filled.
Figure 27:
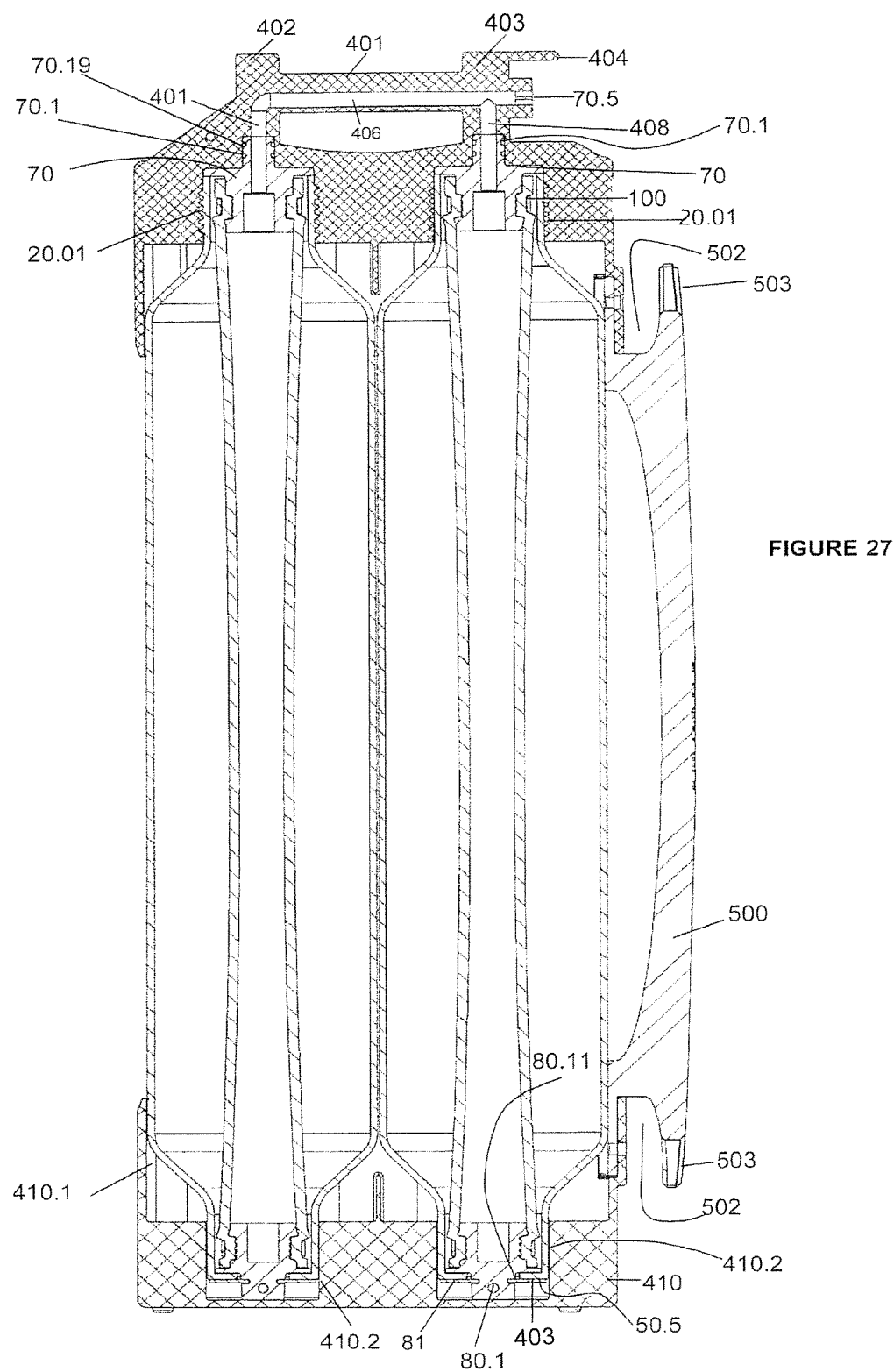
FIG. 27 is a cross section through the reservoir assembly of FIG. 24 with the tubes empty.
Figure 28:
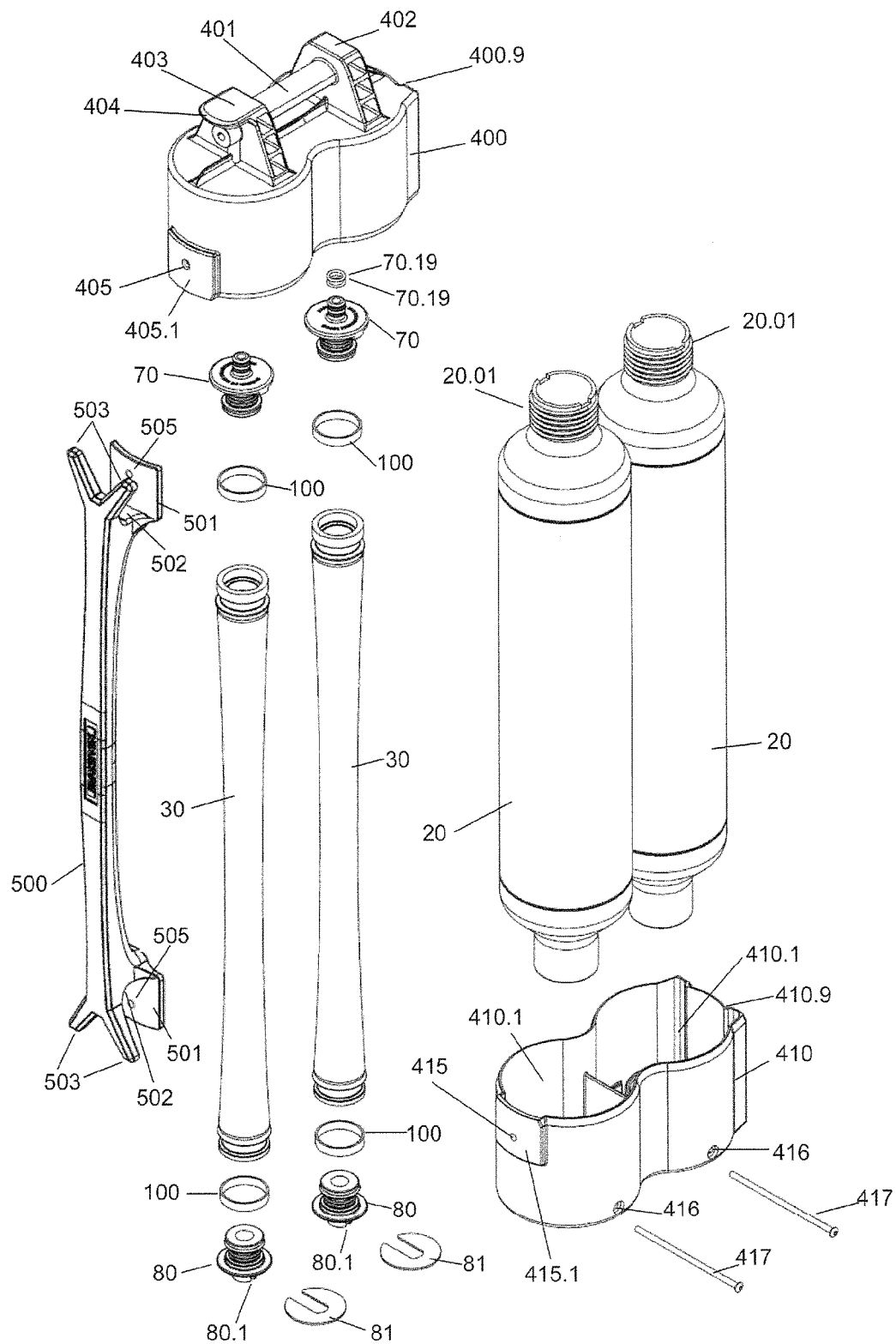
FIG. 28 is an exploded perspective view of the reservoir assembly of FIGS. 24 to 27.

As best illustrated in FIGS. 26 to 28, the canister 20, is of a length of the order of 700 mm and wall thickness of 4 mm, with the inside diameter in the central bulbous portion of 125 mm, while the ends are reduced to approx. 55 mm in Diameter, over approx. 50 mm of length of the canister 20. It can be seen from FIGS. 26 and 27, that the canister 20 has on its reduced diameter portion an externally threaded upper end 20.01 of reduced diameter (approx. 55 mm) by comparison to the straight sided main body portion at 125 mm, which reduces in diameter to about 55 mm near to the base of the canister 20, where there is an integrally moulded rearward or bottom flange 50.5. The canister 20 is preferably manufactured from polyethylene or could be made from ABS and can be blow moulded or injection moulded.

Like previous embodiments, the latex tube 30 is first secured by a stainless steel ring 100 to the top or outlet fitting 70, which has an upper external hollow spigot 70.1, the outside of this spigot having two circumferential sealing grooves therein, to receive O-rings 70.19, so that they can seal against an aperture in the base of the upper cap 400. Once the tube 30 is connected to the outlet fitting 70 by ring 100, and the base plug 80 is fitted to the other end of the tube 30, also by a stainless steel ring 100, with both the rings 100 sealingly clamping the tube 30 to a groove in the fittings 70 and 80, a filament 300, (as in FIG. 15) which when fitted through the aperture 80.1, can be threaded through the canister 20, so that the outlet fitting 70 sits against the top rim of the canister 20, and the filament 300, which will have passed through the bottom aperture through the flange 50.5, can be used to stretch the tube 30. Once the end of plug 80 has passed through the flange 50.5, a C-shaped stainless steel clip or washer 81, can be positioned in an external groove 80.11 on the plug 80, so that the elasticity in the tube 30 will secure the tube 30 in place on the inside of canister 20, which acts as an exoskeletal structure.

Once a canister 20 and tube 30 sub-assembly has been formed, the threaded upper ends 20.01 of the canisters 20 can be screwed into the underside of the upper cap 400. To achieve this, the upper cap 400 has two female threaded recesses 400.01 to receive the ends 20.01. As the canister 20 is screwed into position, this also clamps the outlet fitting 70 between the upper rim of the canister 20 and an inner surface of the threaded recess 400.01.

As best seen in FIGS. 26 and 27, the cap 400 has passages 407 and 408 leading away from the outlet fitting 70, which are connected by an outlet passage 406 which leads to an inlet/outlet port 70.5. The ports and passages are integrally moulded into the cap 400. Externally the cap 400 also has a first formation 402 and a second formation 403 which are interconnected by a handle 401. The passage 406 is formed in the handle 401 while passages 407 and 408 are formed in the formations 402 and 403 respectively. The top of the formation 403 includes an extension portion 404, which overhangs the port 70.5 and the outlet fitting which may be thereon, so as to protect this from being accidentally collided with, which may cause looseness or leakage.

Although the passages 406, 407 and 408 are formed in the cap 400, the formations 402 and 403 are relatively hollow in order to save weight and material. The square hollows 402.1 and 403.1 extend inwardly of the formation to achieve this. The features of the cap 400, including formations and passages etc, are all integrally moulded from ABS.

Once the upper cap 400 and canisters 20 (and stretched and captured tubes 30) have been formed into a sub-assembly, the upper end of a handle 500, can be inserted into a recess 405.1 on a side of the cap 400. The handle 500 is formed from ABS and is preferably injection moulded and amongst other features which will be described below, has a square securing flange 501 which will fit into the recess under the bottom lip of the cap 400. It can there be secured by a machine screw through hole 405 and into threaded aperture 505.

Once the handle 500 has its upper end in the recess 405.1, the lower end of the handle 500 will have its square lower end 501 adjacent the nearest canister 20 and in a position to be received into a recess 415.1 on a base cap 410.

In addition to the square recess 415.1, the base cap 410 has two upper apertures 410.1 (of approx. 134 mm in inside diameter) and two lower blind apertures 410.2 (of approx. 55 mm diameter), the latter receiving the lower ends of respective canisters 20 therein. When the plug 80 is correctly aligned as illustrated, the holes 80.1 will be in alignment with holes 416 in the base cap 410 and a respective bolt 417 can then pass through them, with the threaded end of the bolt 417 entering a threaded boss (not illustrated) on the opposite side of the base cap 410, to thereby secure the base cap 410 to the sub assembly of the canisters and upper cap 400. At this point the lower square flange 501 is in square recess 415.1, aligning the hole 505 on lower end of the handle 500 with the hole 415 on the base cap 410, thereby allowing a second machine screw to join them together.

It will be noted best from FIG. 28, that on the side of the caps 400 and 410 opposite to the handle 500, that there is present a flat section 400.9 on cap 400 and 410.9 on cap 410. These flat sections 400.9 and 410.9 allow the assembly to be rested in a stable manner on a flat surface, so that the handle 500 is upper most and the canisters are horizontal and ready to be picked up and moved. Whereas the flat nature of the base of the base cap 410, allows the assembly 10 to also rest with the canisters 20 in a vertical orientation in a stable fashion on a flat surface.

The base cap 410, the outlet fitting 70 and the plug 80 are preferably manufactured from ABS and injection moulded like the cap 400.

In order to calculate the length of tube 30 for a 700 mm end to end length of canister 20, in respect of the embodiment of FIGS. 24 to 28, the formula of: 0.9*inner diameter of outer tube casing 20/outer diameter of rubber tube 30 up to 1.1*inner diameter of outer tube casing 20/outer diameter of rubber tube 30, is preferably used to calculate the amount of stretch required to the rubber tube 30.

In addition to this, must be taken into account that there is approximately 20 mm of rubber tubing 30 that is clamped at each end of the tubes 30 by attachment to fittings 70 and 80 with clamping rings 100, that wont be stretched as it falls under the clamping ring 100 or behind the clamping ring 100.

Thus for a canister 20 which has an overall length of some 700 mm, the tubing 30 is cut to length of 300 mm.

This is calculated by first calculating the ratio of the inner diameter of the outer tube casing 20 (being 125 mm), to the outer diameter of the rubber tubing 30 (which is approximately 48 mm), the ratio being 125/48 which equals 2.6

The length over which pre-stretching is to occur is thus 700 mm−40 mm=660 mm is to the pre stretched area And so the pre-stretched area divided by the ratio of 2.6=660/2.6=254 mm By adding back the 40 mm to 254 mm a length of approximately 294 mm is calculated, and the tube 30 is cut to a length of 300 mm.

The canister or casing 20 has ends narrowed to an internal diameter of 55 mm and this runs for a length of approx. 48 mm.

The above method is preferred but tolerances on producing this so as to produce a workable embodiment, can be within 10%, and possibly more as per the formulas described above.

Where ever it is used, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

It will be understood that the invention disclosed and defined herein extends to all alternative combinations of two or more of the individual features mentioned or evident from the text. All of these different combinations constitute various alternative aspects of the invention.

While particular embodiments of this invention have been described, it will be evident to those skilled in the art that the present invention may be embodied in other specific forms without departing from the essential characteristics thereof. The present embodiments and examples are therefore to be considered in all respects as illustrative and not restrictive, and all modifications which would be obvious to those skilled in the art are therefore intended to be embraced therein.

The invention claimed is:

1. A fluid reservoir assembly of the type that can store and release fluid under pressure, the assembly having an outer body which enables an inner tube to be stretched and held between the ends of the outer body and the inner tube having an inlet and an outlet for a fluid to enter and exit the inner tube, wherein the inner tube is held stretched in the range of $(0.2*\varnothing_{OB}/\varnothing_{IT})$ to $(2*\varnothing_{OB}/\varnothing_{IT})$ times the at-rest length of said inner tube, where $\varnothing_{OB}$ is the inside diameter or dimension of an aperture through said outer body which is to contain the inner tube and $\varnothing_{IT}$ is the outside diameter of the inner tube when measured at rest and forming a circle.

2. A fluid reservoir assembly as claimed in claim 1, wherein the inner tube is held stretched in the range of $(0.7*\varnothing_{OB}/\varnothing_{IT})$ to $(1.3*\varnothing_{OB}/\varnothing_{IT})$ times the at rest length of said inner tube.

3. A fluid reservoir assembly, as claimed in claim 1, wherein said outer body is formed from an open ended tube.

4. A fluid reservoir assembly as claimed in claim 1, wherein said assembly has an outer body formed of an open ended tube which is closed by end formations which engage respective ends of said open ended tube and are held stationary with respect to said open ended tube, said end formations holding between them an elongated elastic inner tube sealing secured to said end formations, said elastic inner tube being axially pre-tensioned or stretched from its natural or rest state, and secured to said ends in the pre-tensioned or stretched condition.

5. A fluid reservoir assembly as claimed in claim 3, wherein said open ended tube has a central through aperture which is of substantially constant cross section along its length.

6. A fluid reservoir assembly as claimed in claim 3, wherein said open ended tube has reduced diameter apertures at its ends and a larger diameter intermediate section.

7. A fluid reservoir assembly as claimed in claim 3, wherein said open ended tube is closed by end formations which engage respective ends of said open ended tube, and are held stationary with respect to said open ended tube.

8. A fluid reservoir assembly as claimed in claim 7, wherein said end formations hold between them said inner tube.

9. A fluid reservoir assembly as claimed in claim 1, wherein said inlet and said outlet are formed in a single fitting connected to one end of said inner tube.

10. A fluid reservoir assembly as claimed in claim 9, wherein the other end of said inner tube is closed off by a plug fitting to which said inner tube is securely and sealingly attached.

11. A fluid reservoir assembly as claimed in claim 1 wherein, said open ended tube or said end formations include a shaped portion which engage said inner tube when it expands and which prevent said inner tube from expanding in an axial direction.

12. A fluid reservoir assembly as claimed in claim 1, wherein said outer body has a generally circular outer shape in cross section.

13. A fluid reservoir assembly as claimed in claim 12 wherein said outer body is manufactured from one of the following: a polymeric material; a metal; a composite material.

14. A fluid reservoir assembly as claimed in claim 13 wherein said outer body is made by a process of moulding or extrusion.

15. A fluid reservoir assembly as claimed in claim 1 wherein said assembly is adapted to be connected in series or parallel with one or more like assemblies to form an amalgamated reservoir system.

16. A fluid dispensing apparatus for receiving a fluid under pressure and being able to release said fluid as required by an operator, said apparatus having one or more fluid reservoir assembly as claimed in claim 1, wherein said one or more fluid reservoir assemblies are held within or between a first and a second end cap.

17. A fluid dispensing apparatus as claimed in claim 16, wherein said at least one of said fluid reservoir assembly screws into one of said first or second end caps.

18. A fluid dispensing apparatus as claimed in claim 16, wherein said end caps allow said apparatus to rest on a flat surface in a generally horizontal and/or a generally vertical orientation.

19. A fluid dispensing apparatus as claimed in claim 16, wherein one or both of said end caps includes one or more than one of the following: a handle; an inlet and or an outlet port; a means to receive and or secure a handle; a means to receive and or secure an end of said at least one of said fluid reservoir assemblies.

20. A fluid dispensing apparatus as claimed in claim 16 wherein the apparatus is for one or more of the following purposes: storing and or dispensing water or other liquids; storing and or dispensing herbicide and or pesticide; storing and or dispensing energy of a fluid under pressure; storing and or dispensing energy of a liquid under pressure; storing and or dispensing energy of a gas under pressure.

* * * * *